US012443572B2

(12) United States Patent
Koomthanam et al.

(10) Patent No.: US 12,443,572 B2
(45) Date of Patent: Oct. 14, 2025

(54) METHOD TO TRACK AND CLONE DATA ARTIFACTS ASSOCIATED WITH DISTRIBUTED DATA PROCESSING PIPELINES

(71) Applicant: HEWLETT PACKARD ENTERPRISE DEVELOPMENT LP, Houston, TX (US)

(72) Inventors: Annmary Justine Koomthanam, Bangalore (IN); Suparna Bhattacharya, Bangalore (IN); Aalap Tripathy, Houston, TX (US); Sergey Serebryakov, Milpitas, CA (US); Martin Foltin, Ft. Collins, CO (US); Paolo Faraboschi, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/851,546

(22) Filed: Jun. 28, 2022

(65) Prior Publication Data

US 2023/0418792 A1 Dec. 28, 2023

(51) Int. Cl.
*G06F 16/215* (2019.01)
*G06F 16/25* (2019.01)
(Continued)

(52) U.S. Cl.
CPC .......... *G06F 16/215* (2019.01); *G06F 16/254* (2019.01); *G06F 16/27* (2019.01); *G06F 18/214* (2023.01); *G06N 20/00* (2019.01)

(58) Field of Classification Search
CPC ...... G06F 16/27; G06F 16/273; G06F 16/275; G06F 16/278; G06F 16/215; G06F 16/254; G06F 18/214; G06N 20/00
See application file for complete search history.

(56) References Cited

U.S. PATENT DOCUMENTS 9,904,614 B2 2/2018 Stevens et al.
10,452,781 B2 10/2019 Verma
(Continued)

OTHER PUBLICATIONS

Splunk, Use the Data Stream Processor, pp. 1-4, last modified Mar. 22, 2022, https://docs.splunk.com/Documentation/DSP/1.4.3/User/CreateStreamsJSON (Year: 2022).*
(Continued)

*Primary Examiner* — Allen S Lin
(74) *Attorney, Agent, or Firm* — Dickinson Wright

(57) ABSTRACT

Systems and methods are provide for automatically constructing data lineage representations for distributed data processing pipelines. These data lineage representations (which are constructed and stored in a central repository shared by the multiple data processing sites) can be used to among other things, clone the distributed data processing pipeline for quality assurance or debugging purposes. Examples of the presently disclosed technology are able to construct data lineage representations for distributed data processing pipelines by (1) generating a hash content value for universally identifying each data artifact of the distributed data processing pipeline across the multiple processing stages/processing sites of the distributed data processing pipeline; and (2) creating an data processing pipeline abstraction hierarchy for associating each data artifact to input and output events for given executions of given data processing stages (performed by the multiple data processing sites).

20 Claims, 9 Drawing Sheets

(51) Int. Cl.
    *G06F 16/27*     (2019.01)
    *G06F 18/214*     (2023.01)
    *G06N 20/00*     (2019.01)

(56) References Cited

U.S. PATENT DOCUMENTS

| | | | |
|---|---|---|---|
| 10,528,367 | B1 | 1/2020 | Liu et al. |
| 10,698,733 | B1 | 6/2020 | Lee et al. |
| 11,099,835 | B1 | 8/2021 | Wall et al. |
| 11,150,895 | B1 | 10/2021 | Wall |
| 2018/0232295 | A1* | 8/2018 | Sukoco ............... G06F 11/3409 |
| 2018/0341701 | A1 | 11/2018 | Verma et al. |
| 2020/0118653 | A1* | 4/2020 | Hagenbuch ............ G16H 40/20 |
| 2021/0173826 | A1* | 6/2021 | Kaza ....................... G06F 16/23 |
| 2021/0226929 | A1 | 7/2021 | Kiyanclar et al. |
| 2021/0281659 | A1* | 9/2021 | Syckel .................... H04L 67/02 |
| 2021/0303297 | A1* | 9/2021 | Islam ..................... H04L 63/083 |
| 2021/0326454 | A1 | 10/2021 | Sekhar |
| 2021/0374247 | A1* | 12/2021 | Sultana ................... G06F 21/57 |
| 2022/0138115 | A1* | 5/2022 | Klaedtke ............. G06F 12/1425 |
| | | | 711/163 |

OTHER PUBLICATIONS

Kilian Kluge, "13 Best Tools for ML Experiment Tracking and Management in 2025", available online at <https://neptune.ai/blog/best-ml-experiment-tracking-tools>, Apr. 23, 2025, 26 pages.

\* cited by examiner

METHOD TO TRACK AND CLONE DATA ARTIFACTS ASSOCIATED WITH DISTRIBUTED DATA PROCESSING PIPELINES

BACKGROUND

A data processing pipeline may refer to a series of executions (i.e., processing steps) that transform one or more data artifacts (e.g., raw data, datasets, analytical or machine learning (ML) models derived from data, etc.) into one or more new data artifacts (e.g., new datasets, analytical or ML models derived from data, dashboards displaying one or more of the foregoing data-artifacts, etc.). In many cases, data processing pipelines are comprised of processing stages (e.g., a data discovery/preparation stage, an ML model preparation stage, an ML model training stage, etc.). A given processing stage may be comprised of one or more executions. An execution may be a data processing step that transforms one or more data artifacts. In other words, an execution may receive one or more input data artifacts (i.e., data artifacts received as inputs to the execution), and transform them into one or more output data artifacts (i.e., data artifacts produced by the execution). A data artifact may be an output from one execution, and/or an input into one or more different executions. For example, in addition to being an output of a first execution of a first processing stage, a first data artifact may also be an input into a first execution of a second processing stage.

In many cases, the multiple processing stages of a data processing pipeline may be performed by different data processing sites (e.g., different datacenters, edge computing sites, etc.). Data processing pipelines performed across multiple data processing sites may be referred to as "distributed data processing pipelines." In many cases, the data processing sites of a distributed data processing pipeline will be disconnected from each other, but may be at least intermittently connected to a central repository (e.g., a central datacenter) for storing data artifacts consumed/produced by the distributed data processing pipeline.

BRIEF DESCRIPTION OF THE DRAWINGS

The present disclosure, in accordance with one or more various examples, is described in detail with reference to the following figures. The figures are provided for purposes of illustration only and merely depict typical or examples.

Figure 1:
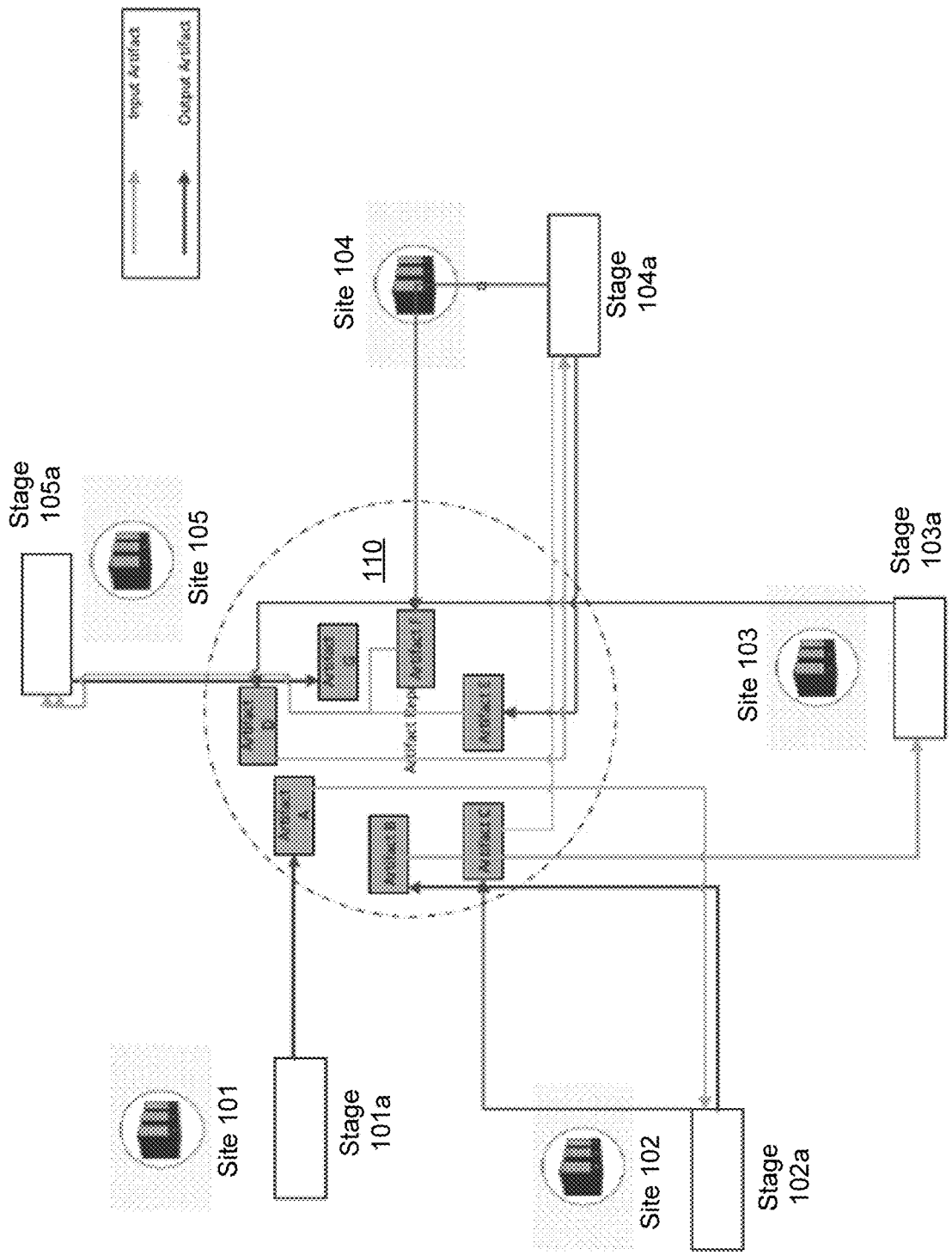
FIG. 1 depicts an example distributed data processing pipeline, in accordance with various examples of the presently disclosed technology.

The figures are not exhaustive and do not limit the present disclosure to the precise form disclosed.

DETAILED DESCRIPTION

Interactions in distributed data processing pipelines can be highly complex. As described above, distributed data processing pipelines can consist of multiple processing stages distributed across various data processing sites. Each processing stage may include multiple executions which transform data artifacts. In a complex distributed data processing pipeline, a given data artifact may be an input into, and/or output from, multiple executions performed across multiple data processing sites.

Within a data processing pipeline (distributed or otherwise), there are often dependencies between processing stages and executions, which can affect performance metrics for ultimate/downstream output data artifacts of the data processing pipeline (e.g., datasets, ML models, etc.). In other words, data artifacts consumed/produced (along with executions performed) in an earlier processing stage of a data processing pipeline may influence data quality metrics (e.g., ML model accuracy) for data artifacts produced in later processing stages of the data processing pipeline. Accordingly, it can be important to track metadata across a data processing pipeline to provide functionality like data lineage tracking, provenance and reproducibility. Relatedly, government regulations often require inspection of data artifacts (and/or executions) of a data processing pipeline when certain events occur (e.g., poor model performance, model bias, etc.). To perform regulatory (or non-regulatory) inspections, it can be advantageous to clone an entire data processing pipeline including its code, data artifacts, metadata, and dependencies in order to locally reproduce its execution for testing and debugging purposes.

However, tracking metadata and data lineages for distributed data processing pipelines presents a significant challenge—which existing technologies have struggled to address. In particular, the multiple data processing sites of a distributed data processing pipeline are not typically connected, and may only have intermittent connection to a central repository for storing e.g., data artifacts consumed/produced by the data processing pipeline. This lack of direct connection/collaboration between distributed data processing sites/teams often prevents comprehensive and consistent tracking of data lineages and metadata for distributed data processing pipelines. Accordingly, existing technologies have struggled to clone distributed data processing pipelines for testing and debugging purposes. Related factors that can make comprehensive and consistent tracking of data lineages and metadata for distributed data processing pipelines difficult include: (1) different data processing sites commonly assigning identical names to data artifacts which are not identical; and (2) different data processing sites commonly assigning different names to data artifacts which are identical. As alluded to above, such data artifact naming inconsistencies can present a significant challenge when it comes to tracking metadata and data lineages for a distributed data processing pipeline; and (2) cloning the distributed data processing pipeline.

Against this backdrop, examples of the presently disclosed technology provide computerized systems and methods for automatically constructing data lineage representations for distributed data processing pipelines. These data lineage representations (which are constructed and stored in a central repository shared by the multiple data processing sites) can be used to among other things, clone the distributed data processing pipeline for quality assurance or debugging purposes.

Examples of the presently disclosed technology are able to construct data lineage representations for distributed data processing pipelines by (1) generating a hash content value for universally identifying each data artifact of the distributed data processing pipeline across the multiple processing stages/processing sites of the distributed data processing pipeline; and (2) creating a data processing pipeline abstraction hierarchy for associating each data artifact to input and output events for given executions of given data processing stages (performed by the multiple data processing sites).

In various instances, examples may provide computerized central repositories (e.g., centralized datacenters) shared by the multiple data processing sites of a distributed data processing pipeline that: (1) receive, from each data processing site of the distributed data processing pipeline, specially tailored information comprising, for a given information: (a) a unique hash content value that identifies a given data artifact; and (b) an indication that the given data artifact was an input to, or output from, a given execution of a given processing stage performed by a given data processing site; (2) based on the received information, construct a data lineage representation for the distributed data processing pipeline; and (3) export to one or more of the data processing sites, the constructed data lineage representation. Accordingly, the one or more data processing sites may utilize the constructed data lineage representation to locally reproduce/clone the distributed data processing pipeline for e.g., testing and debugging purposes.

As described above, examples of the presently disclosed technology are able to construct data lineage representations for distributed data processing pipelines where existing technologies have struggled/failed by (1) generating a hash content value for universally identifying each data artifact of a distributed data processing pipeline across the multiple processing stages/processing sites of the distributed data processing pipeline; and (2) creating a data processing pipeline abstraction hierarchy for associating each data artifact to input and output events for given executions of given data processing stages (performed by the multiple data processing sites). Examples may then utilize these constructed data lineage representations to clone the distributed data processing pipeline for e.g., testing and debugging purposes.

Here, the generated hash content values may function as identifying keys/links that allow examples of the presently disclosed technology to construct data lineage representations for distributed data processing pipelines. In other words, examples of the presently disclosed technology may utilize the generated hash content values to determine that e.g., the same data artifact (e.g., a first data artifact) is both an output of an execution of a first processing stage, and an input to an execution of a second processing stage—even when the two processing stages are performed by different individuals at different data processing sites. The unique (and as will be described below, consistent) identification for data artifacts provided by hash content values plays a key role where data artifacts are operated on by multiple data processing sites of a distributed data processing pipeline. As described above, this is because in many cases: (1) different data processing sites commonly assign identical names to data artifacts which are not identical; and (2) different data processing sites commonly assign different names to data artifacts which are identical. As alluded to above, such naming inconsistencies for data artifacts can present a significant challenge when it comes to tracking metadata and data lineages for a distributed data processing pipeline. As will be described below, by having the multiple data processing sites of a distributed data processing pipeline utilize the same hash algorithm/function for generating hash content values for data artifacts, examples may ensure that data artifacts are consistently named/identified across the multiple data processing sites. Such a common naming/identification scheme for data artifacts allows examples of the presently disclosed technology to construct data lineage representations for distributed data processing pipelines more accurately than existing technologies.

As described above, the specially tailored information received by the central repository also include an indication that a given data artifact (identified by the given data artifact's hash content value) was an input to, or output from, a given execution of a given data processing stage. Here, examples of the presently disclosed technology may leverage a data processing pipeline abstraction hierarchy (described in greater detail in conjunction with FIG. 2) to make this indication. The data processing pipeline abstraction hierarchy of the presently disclosed technology may comprise: (1) a data processing pipeline level; (2) a processing stage level beneath the data processing pipeline level; (3) an execution level beneath the processing stage level; and (4) an input/output event relationship for the execution level. Using this data processing pipeline abstraction hierarchy, examples may associate each data artifact of a data processing pipeline with (1) at least one of an input event or an output event; (2) the given execution(s) associated with the input/output event(s); (3) the given processing stage(s) associated with the given execution(s); and (4) the distributed data processing pipeline associated with the given processing stage(s). As described above, based on these associations, examples of the presently disclosed technology (e.g., the central repository) may construct a data lineage representation for the distributed data processing pipeline more accurately and with greater consistently than existing technologies. Examples of the presently disclosed technology then use these constructed data lineage representation to e.g., test or debug the cloned distributed data processing pipeline.

FIG. 1 depicts an example distributed data processing pipeline 100, in accordance with various examples of the presently disclosed technology.

As depicted, distributed data processing pipeline 100 comprises five processing stages (i.e., processing stages 101a, 102a, 103a, 104a, and 105a) performed by five data processing sites (i.e., data processing sites 101, 102, 103, 104, and 105) respectively. Each data processing site may be e.g., a datacenter, an edge computing site, etc. The multiple data processing sites of distributed data processing pipeline 100 may be disconnected from each other, but may be at least intermittently connected to data artifact repository 110. As will be described below, data artifact repository 110 may be a (logically) central location that stores the data artifacts (i.e., data artifacts A-G) consumed and/or produced during executions of data processing pipeline 100.

Data processing site 101 may perform processing stage 101a of data processing pipeline 100 (e.g., a data discovery/preparation stage). In various examples, this may be the first processing stage of distributed data processing pipeline 100. Data processing site 102 may perform processing stage 102a of data processing pipeline 100 (e.g., an ML model preparation stage). In various examples, this may be the second processing stage of distributed data processing pipeline 100. Data processing site 103 may perform processing stage 103a of distributed data processing pipeline 100 (e.g., an ML model training stage). In various examples, this may be the third processing stage of distributed data processing pipeline 100. Similarly, data processing sites 104 and 105 may perform processing stage 104a and 105a respectively. In various examples, processing stages 104a and 105a may be the fourth and fifth processing stages of distributed data processing pipeline 100.

At a given processing stage, a given data processing site may perform one or more executions for the given processing stage. An execution may be a data processing step that transforms one or more data artifacts. In other words, an execution may receive one or more input data artifacts (i.e., data artifacts received as inputs to the execution), and transform them into one or more output data artifacts (i.e., data artifacts produced by the execution). A data artifact (including data artifacts A-F) may be a data-related input or output of distributed data processing pipeline 100 (e.g., raw data, a processed dataset, an analytical or ML model derived from data, etc.). A data artifact may be an output from one execution, and/or an input into one or more different executions. For example, as depicted, data artifact B is an output from a first execution of processing stage 102a, and an input to a first execution of processing stage 103a. Similarly, data artifact C is an output from a second execution of processing stage 102a, and in input into both a first execution of processing stage 103a and a first execution of processing stage 104a.

As illustrated by even the simplified example of FIG. 1, distributed data processing pipelines may comprise a complex network of data transformations/executions where a given data artifact may be an input to, and/or output from, multiple executions of the distributed data processing pipeline. As these executions are performed across multiple data processing sites, this network of transformations/executions can become even more complex and difficult to track. As will be described below, by having the multiple data processing sites of a distributed data processing pipeline utilize a common hash algorithm/function to generate hash content values for identifying data artifacts, examples of the presently disclosed technology can ensure that data artifacts are consistently named/identified across the multiple data processing sites. Such a common naming/identification scheme for data artifacts allows examples of the presently disclosed technology to construct data lineage representations for distributed data processing pipelines more accurately and consistently than existing technologies. Utilizing these data lineage representations, examples can clone an entire data processing pipeline including its code, data, metadata and all its associated its dependencies. Examples may then use the clone to locally reproduce the data processing pipeline's execution for testing and debugging purposes. Examples may also clone a distributed data processing pipeline (or part of the distributed data processing pipeline) in order to expand the distributed data processing pipeline, or to perform additional experiments/executions on a particular stage of the distributed data processing pipeline.

Figure 2:
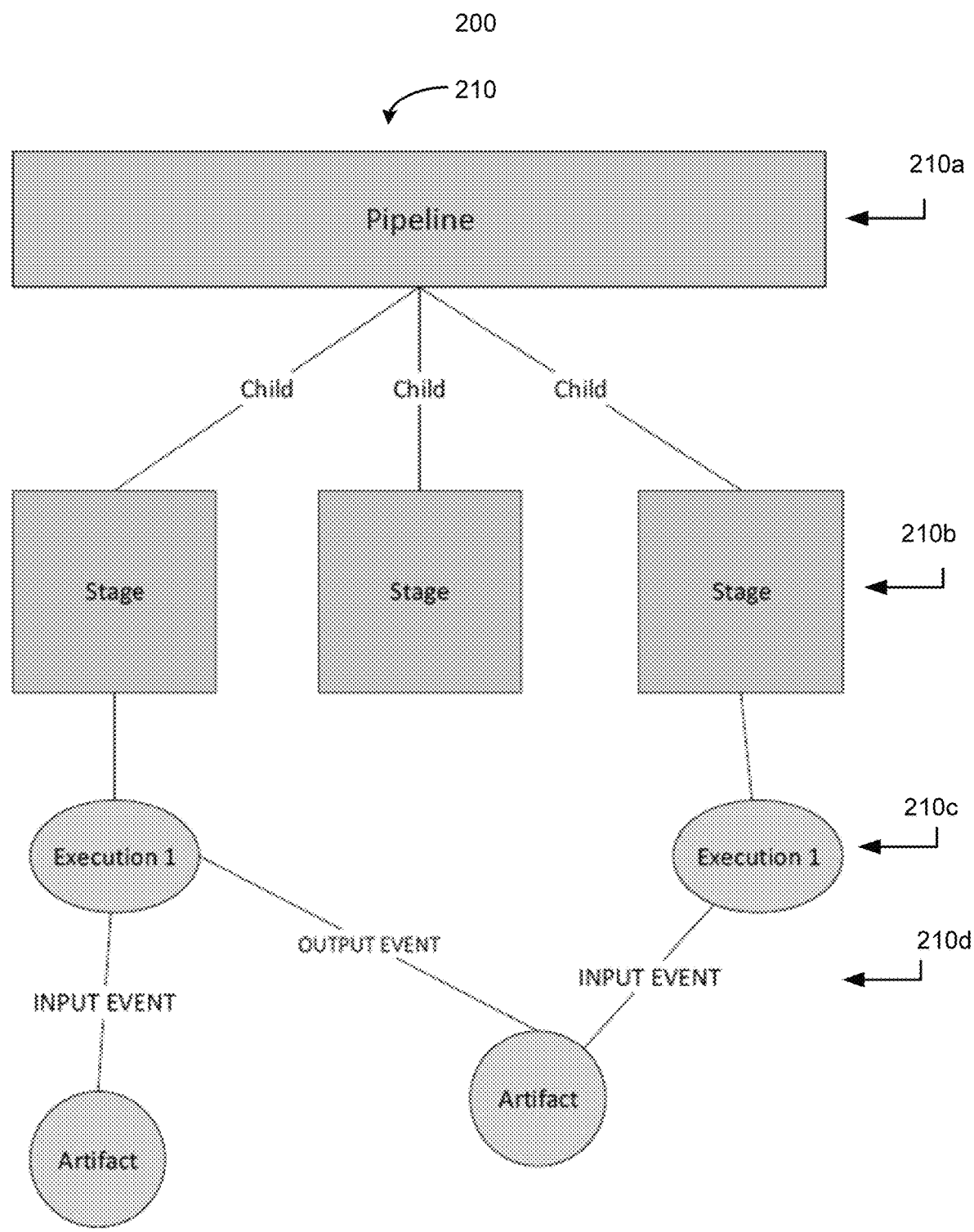
FIG. 2 depicts an example data processing pipeline abstraction hierarchy for a distributed data processing pipeline, in accordance with various examples of the presently disclosed technology.

FIG. 2 depicts an example data processing pipeline abstraction hierarchy 210 for a distributed data processing pipeline 200, in accordance with various examples of the presently disclosed technology.

As described above, examples of the presently disclosed technology can define abstractions/abstraction levels that can be used to construct data lineage representations for data processing pipelines (as well as their constituent data artifacts) consistently across distributed data processing sites. Accordingly, data processing pipeline abstraction hierarchy 210 may represent an entire distributed data processing pipeline 200 which contains multiple processing stages, each processing stage being performed/executed by a different data processing site. As depicted, data processing pipeline abstraction hierarchy 210 includes: (1) a data processing pipeline level 210a; (2) a processing stage level 210b beneath data processing pipeline level 210a; (3) an execution level 210c beneath processing stage level 210b; and (4) an input/output event relationship 210d for execution level 210c. Using data processing pipeline abstraction hierarchy 210, examples may associate each data artifact of distributed data processing pipeline 200 with (1) at least one of an input event or an output event; (2) the given execution(s) associated with the input/output event(s); (3) the given processing stage(s) associated with the given execution(s); and (4) the given data processing pipeline (i.e., data processing pipeline 200) associated with the given processing stage(s). As described above, based on these associations, examples of the presently disclosed technology can construct a data lineage representation for distributed data processing pipeline 200 (and/or each of its constituent data artifacts). Each level of data processing pipeline abstraction hierarchy 210 will be described in greater detail in the following paragraphs.

Data processing pipeline level 210a: As depicted, data processing pipeline level 210a is the pipeline level of data processing pipeline abstraction hierarchy 210. Utilizing this abstraction level, examples of the presently disclosed technology can assign a unique identifier (e.g., a pipeline name) to each unique data processing pipeline they operate on. These unique identifiers may be used to compile/log the processing stages, executions, input/output events, and data artifacts—associated with a given data processing pipeline.

Processing stage level 210b: As depicted, the next level below data processing pipeline level 210a, is processing stage level 210b. A given data processing pipeline may be comprised of multiple processing stages (e.g., a data discovery/preparation stage, an ML model preparation stage, an ML model training stage, an ML model inference stage, etc.). As described above, examples of the presently disclosed technology may construct data lineage representations for data processing pipelines even where multiple processing stages are performed across different data processing sites.

Utilizing this abstraction level, examples of the presently disclosed technology may assign a unique identifier (e.g., a processing stage name) to each unique processing stage of a given data processing pipeline. These unique identifiers may be used to compile/log the executions, input/output events, and data artifacts—associated with a given processing stage.

Execution level 210c: As depicted, the next level below processing stage level 210b, is execution level 210c. A given processing stage may be comprised of one or more executions. An execution may be a data processing step that transforms one or more data artifacts. In other words, an execution may receive one or more input data artifacts (i.e., data artifacts received as inputs to the execution), and transform them into one or more output data artifacts (i.e., data artifacts produced by the execution).

Utilizing this abstraction level, examples of the presently disclosed technology may assign a unique identifier (e.g., an execution name) to each unique execution of a processing stage. These unique identifiers may be used to compile/log input/output events, and data artifacts—associated with a common execution.

Input/output event relationship 210*d*: As depicted, a given execution may be comprised of an input event and an output event. An input event may relate to the process of inputting data artifacts into a given execution. As described above, using data processing pipeline abstraction hierarchy 210, examples may associate the one or more data artifacts input to (and then transformed) by the given execution, to the input event for the given execution. An output event may relate to the process of outputting data artifacts from the given execution. As described above, using data processing pipeline abstraction hierarchy 210, examples may associate the one or more data artifacts output from/produced by the given execution, to the output event for the given execution.

In this way, examples may associate each data artifact of distributed data processing pipeline 200 with (1) at least one of an input event or an output event; (2) the given execution(s) associated with the input/output event(s); (3) the given processing stage(s) associated with the given execution(s); and (4) the given data processing pipeline (i.e., distributed data processing pipeline 200) associated with the given processing stage(s). As described above, based on these associations, examples of the presently disclosed technology may construct a data lineage representation for distributed data processing pipeline 200 (and/or each of its constituent data artifacts).

Figure 3:
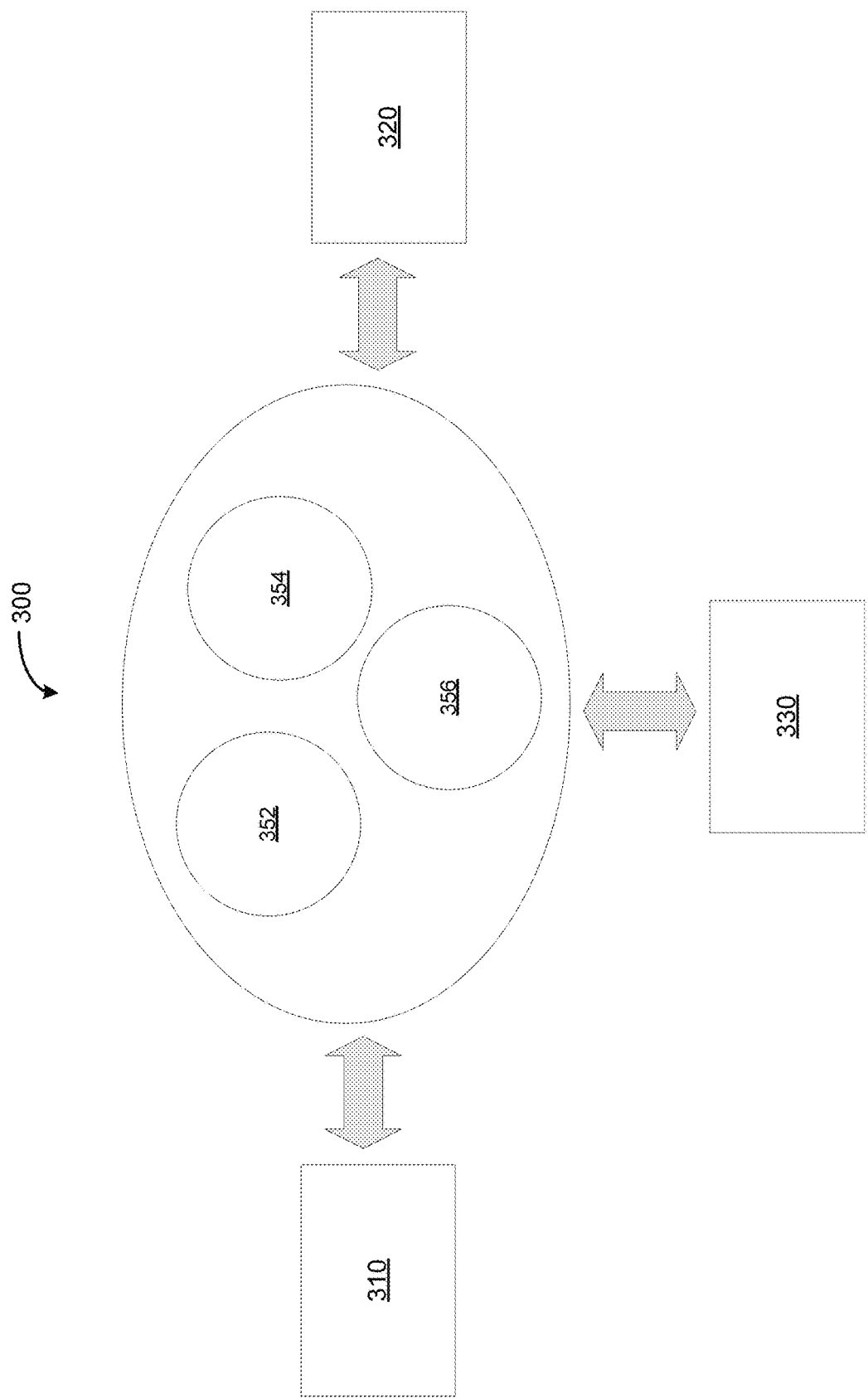
FIG. 3 depicts an example workflow for an example distributed data processing pipeline, in accordance with various examples of the presently disclosed technology.

FIG. 3 is depicts an example workflow for an example distributed data processing pipeline 300, in accordance with various examples of the presently disclosed technology.

Distributed data processing pipeline 300 comprises three processing stages performed by three data processing sites (e.g., datacenters, edge computing sites, etc.). In particular, data processing site 310 performs a raw data acquisition stage, data processing site 320 performs a data processing stage, and data processing site 330 performs an inspection stage. As depicted, each data processing site is at least intermittently connected to a central repository 350 (e.g., a central datacenter, a GitHub, etc.). However (and importantly), the data processing sites need not be connected to each other (i.e., they may be distributed). Accordingly, the data processing sites may work independently from each other (and in many cases off-line) when performing their respective processing stages (as will be described below, when each data processing site completes its work, it may export its results to central repository 350). This independent mode of operation may be advantageous for data security and privacy purposes. Such operation may also facilitate collaboration between multiple remotely located individuals/teams in a manner that improves data security for those involved.

Central repository 350 (e.g., a central datacenter, a GitHub, etc.) may be a repository which is (logically) centrally located with respect to data processing sites 310-330 (however it should be understood that central repository 350 may be physically distributed, among e.g., data processing sites 310-330). As depicted, central repository 350 may comprise multiple sub-repositories such as: central artifact repository 352 (i.e., a central sub-repository for storing the data artifacts of distributed data processing pipeline 300); central code repository 354 (i.e., a central sub-repository for storing code used in executions of distributed data processing pipeline 300); and central metadata repository 356 (i.e., a central sub-repository for storing metadata associated with the data artifacts and executions of distributed data processing pipeline 300). In various examples, central repository 350 may utilize Git as an index for the stored data artifacts, code, and metadata.

As described above, data processing site 310 may perform a first processing stage of distributed data processing pipeline 300 (i.e., the raw data acquisition stage), data processing site 320 may perform a second processing stage of distributed data processing pipeline 300 (i.e., the data processing stage), and data processing site 330 may perform a third processing stage of distributed data processing pipeline 300 (i.e., the inspection stage). In various examples, other data processing sites of distributed data processing pipeline 300 may perform additional processing stages of distributed data processing pipeline 300.

At a given processing stage, a given data processing site may perform one or more executions for the given processing stage. An execution may be a data processing step that transforms one or more data artifacts. In other words, an execution may receive one or more input data artifacts (e.g., one or more raw data artifacts) and transform them into one or more output data artifacts (e.g., one or more processed/distilled data artifacts such as datasets). A data artifact may be a data-related input or output of a data processing pipeline (e.g., raw data, a processed dataset, an analytical or ML model derived from data, etc.). A data artifact may be an output from one execution, and/or an input into one or more different executions. For example, in addition to being an output of an execution of the raw data acquisition stage, a given raw data artifact may also be an input into an execution of the data processing stage. Each stage of distributed data processing pipeline 300 will be described in greater detail in the following paragraphs.

Raw Data Acquisition Stage (performed by data processing site 310): At the raw data acquisition stage, data processing site 310 collects raw data artifacts for future processing by distributed data processing pipeline 300. Data processing site 310 also collects the code (or at least a version of the code) used to collect the raw data artifacts. Such code may be associated with executions used to collect the raw data artifacts.

In addition to collecting raw data artifacts and the code (or at least a version of the code) used to collect them, data processing site 310 also creates metadata associated with the collected raw data artifacts. The created metadata for a given collected raw data artifact includes: (1) a hash content value that identifies the given collected raw data artifact; and (2) an indication that the given collected raw data artifact was an output of a given execution of the raw data acquisition stage.

As described above, the created hash content values may function as identifying keys/links that allow examples of the presently disclosed technology (including central repository 350) to construct a data lineage representation for distributed data processing pipeline 300 and/or its constituent data artifacts. In other words, examples of the presently disclosed technology (including central repository 350) may utilize the created hash content values to determine that e.g., the same data artifact (e.g., a first collected raw data artifact) is both an output of an execution of the raw data acquisition stage, and an input to an execution of the data processing stage—even when the two processing stages are performed by different individuals at different data processing sites (i.e., data processing sites 310 and 320 respectively). The unique identification for data artifacts provided by the hash content values of the presently disclosed technology plays a key role where data artifacts are operated on by multiple data processing sites of a data processing pipeline. This is because in many cases, distributed data processing sites will e.g., (1) use different names/tags for the same data artifact (i.e., a first data processing site may use a first name/tag for a first data artifact and a second data processing site may use a second name/tag for the (same) first data artifact); or (2) use the same/name tag for different data artifacts (i.e., a first data processing site may use a first name/tag for a first data artifact and a second data processing site may use the (same) first name/tag for a second (different) data artifact). As will be described below, by having the multiple data processing sites of a distributed data processing pipeline utilize the same hash algorithm/function for generating hash content values for data artifacts, examples may ensure that data artifacts are consistently named/identified across the multiple data processing sites. Such a common naming/identification scheme for data artifacts allows examples of the presently disclosed technology to construct data lineage representations for data processing pipelines (and/or their constituent data artifacts) more accurately and consistently than existing technologies.

Hash content values can be thought of as unique fingerprints for data artifacts. Typically, a hash content value will be a string of numerical and/or alphabetic values that uniquely identifies a data artifact. Hash content values may be generated using hash functions (e.g., cryptographic algorithms) which generate hash content values based on the content of the data artifacts. Two common hash functions/algorithms for generating hash content values for data artifacts are the MD5 and SHA1 algorithms.

Accordingly, data processing site 310 may utilize a hash function/algorithm to create/generate unique hash content values for each collected raw data artifact.

In various examples, all the data processing sites of distributed data processing pipeline 300 may utilize a common hash function/algorithm for creating hash content values. For example, data processing sites 310-330 may utilize the MD5 algorithm to create hash content values for data artifacts. Thus, a first hash content value (identifying, e.g., a first collected raw data artifact) created by data processing site 310 may comprise the same numerical/alphabetic string as a corresponding hash content value (identifying the first collected raw data artifact) created by data processing site 320. By contrast, a second hash content value (identifying, e.g., a second collected raw data artifact) created by data processing site 310 may comprise a different numerical/alphabetic string than the first hash content value. As described above, by having the multiple data processing sites of a data processing pipeline utilize the same hash algorithm/function for generating hash content values for data artifacts, examples can ensure that data artifacts are consistently named/identified across multiple data processing sites. Such a common naming/identification scheme for data artifacts allows examples of the presently disclosed technology to construct accurate and complete data lineage representations for distributed data processing pipelines and/or their constituent data artifacts.

As described above, the metadata (created by data processing site 310) for a given collected raw data artifact also includes an indication that the given collected raw data artifact (identified by the given collected raw data artifact's hash content value) was an output from a given execution of the raw data acquisition stage. Here, data processing site 310 may leverage the data processing pipeline abstraction hierarchy described in conjunction with FIG. 2 to make this indication. As described in conjunction with FIG. 2, the data processing pipeline abstraction hierarchy of the presently disclosed technology may comprise: (1) a data processing pipeline level; (2) a processing stage level beneath the data processing pipeline level; (3) an execution level beneath the processing stage level; and (4) an input/output event relationship for the execution level. Using this data processing pipeline abstraction hierarchy, examples may associate each data artifact of a data processing pipeline with (1) at least one of an input event or an output event; (2) the given execution(s) associated with the input/output event(s); (3) the given processing stage(s) associated with the given execution(s); and (4) the given data processing pipeline associated with the given processing stage(s). As described above, based on these associations, examples of the presently disclosed technology may construct a data lineage representation for the given data processing pipeline and/or its constituent data artifacts.

In various examples, the metadata created by data processing site 310 may also include a description of the physical location in a data artifact repository (e.g., central artifact repository 352) where the given collected raw data artifact is located. In certain examples, data processing site 310 may create/collect additional metadata associated with the collected raw data artifacts and the code/executions used to collect them (e.g., textual documentation of data sources for a collected raw data artifact, descriptions of content within the collected raw data artifact, data size and data distribution for the collected raw data artifact, programming language for an execution, information about input fields used for execution, class of algorithm used for the execution, staging or quality assurance (QA) status for the execution, names of developers/data scientists involved with the execution, etc.).

Once collected/created, data processing site 310 may export (1) the raw data artifacts, (2) the code used in executions for collecting the raw data artifacts, and (3) the metadata associated with collected raw data artifacts (and in some cases, the metadata associated with executions used to collect the raw data artifacts) to central repository 350. For example, data processing site 310 may export the collected code associated with the raw data acquisition stage to central code repository 354 (i.e., the central repository for storing code used in executions of distributed data processing pipeline 300). Similarly, data processing site 310 may export the collected raw data artifacts to central artifact repository 352 (i.e., the central repository for storing the data artifacts of distributed data processing pipeline 300) using e.g., data versioning software like Data Version Control (DVC). Data processing site 310 may also export the collected metadata to central metadata repository 356 (i.e., the central repository for storing the metadata associated with the data artifacts and executions of distributed data processing pipeline 300).

As described above, exported metadata for a given collected raw data artifact may comprise: (1) a hash content value that identifies the given collected raw data artifact; (2) an indication that the given collected raw data artifact was an output of a given execution of the raw data acquisition stage; and (3) other metadata associated with the given collected raw data artifact. Where central metadata repository 356 receives a hash content value for the first time, central metadata repository 356 may create a new metadata entry for the data artifact identified by the (newly encountered) hash content value. By contrast, where central metadata repository 356 has encountered a hash content value before, central metadata repository 356 can merge the newly received metadata entry with one or more existing metadata entries associated with the data artifact identified by the previously encountered hash content value. In this way, central metadata repository 356 may stitch together both a data lineage representation and a metadata representation for the data artifact, and distributed data processing pipeline 300 as a whole.

Data Processing Stage (performed by data processing site 320): At the data processing stage, data processing site 320 processes raw data artifacts collected (and then exported) by data processing site 310. Here, data processing site 320 may process the collected/exported raw data artifacts into more distilled data artifacts (e.g., processed datasets, machine learning models, etc.). Data processing site 320 may extract the raw data artifacts from central artifact repository 352.

Similar to data processing site 310, data processing site 320 may create metadata for each data artifact consumed (i.e., the raw data artifacts extracted from central artifact repository 352) and produced (i.e., the distilled data artifacts) in the data processing stage. As described above, the created metadata for a given data artifact may comprise: (1) a hash content value that identifies the given data artifact; and (2) an indication that the given data artifact was at least one of an input to, and an output from, a given execution of the data processing stage.

Here, data processing site 320 may utilize the same hash function/algorithm as data processing site 310 to create the hash content values. Accordingly, data processing site 320 and data processing site 310 should create the same hash content values (i.e., the same numerical and/or alphabetic strings) for common data artifacts (e.g., a first raw data artifact collected/exported by data processing site 310, and extracted/processed by data processing site 320). As discussed above (and as will be described in greater detail below), examples of the presently disclosed technology may utilize these hash content values to stitch together data lineage representations for distributed data processing pipeline 300 (and/or its constituent data artifacts).

As described above, metadata created by data processing site 320 may also include an identification of the physical location in a data artifact repository (e.g., data artifact repository 352) where a given data artifact is located. In certain examples, data processing site 320 may create/collect additional metadata associated with the consumed/produced data artifacts and the code/executions used to process them (e.g., textual documentation for the data artifacts, descriptions of content within the data artifacts, data sizes and data distributions for the data artifacts, programming language for an execution that transformed a data artifact, information about input fields used for the execution, class of algorithm used for the execution, staging or quality assurance (QA) status for the execution, names of developers/data scientists involved with the execution, etc.).

Data processing site 320 may export (1) the newly produced distilled data artifacts (and in certain examples the extracted raw data artifacts used to the produce the distilled data artifacts), (2) the code used in executions for producing the distilled data artifacts, and (3) the metadata associated with distilled data artifacts (and in some cases, the metadata associated with the executions used to produce the distilled artifacts)—to central repository 350. For example, data processing site 320 may export the code associated with the data processing stage to central code repository 354 (i.e., the central repository for storing code used in executions of distributed data processing pipeline 300). Similarly, data processing site 320 may export the distilled data artifacts to central artifact repository 352 (i.e., the central repository for storing the data artifacts of distributed data processing pipeline 300) using e.g., data versioning software like Data Version Control (DVC). Data processing site 310 may also export the metadata for the data processing stage to central metadata repository 356 (i.e., the central repository for storing the metadata associated with the data artifacts and executions of distributed data processing pipeline 300).

As described above, exported metadata for a given data artifact may comprise: (1) a hash content value that identifies the given data artifact; (2) an indication that the given data artifact was at least one of an input to, or output from, a given execution of the data processing stage; and (3) other metadata associated with the given data artifact. Where central metadata repository 356 receives a hash content value for the first time (e.g., a hash content value for a newly produced distilled data artifact), central metadata repository 356 may create a new metadata entry for the data artifact identified by the (newly encountered) hash content value. Where central metadata repository 356 has encountered a hash content value before (e.g., for a raw data artifact collected by data processing site 310, and extracted/processed by data processing site 320), central metadata repository 356 can merge the newly exported metadata entry with existing metadata entries associated with the given data artifact identified by the previously encountered hash content value. In this way, central metadata repository 356 may stitch together both a data lineage representation and a metadata representation for the given data artifact, and distributed data processing pipeline 300 as a whole. For example, central metadata repository 356 may have received, from data processing site 310, metadata associated with a first raw data artifact, and logged an associated metadata entry for the first raw data artifact. This logged metadata entry may include an indication that the first raw data artifact was an output of a given execution of the raw data acquisition stage. Central metadata repository 356 may then receive, from data processing site 320, metadata associated with the first raw data artifact which indicates that the first raw data artifact was an input to a given execution of the data processing stage. Here central metadata repository 356 may utilize the received hash content value for the first raw data artifact to determine that the same (i.e., the first raw data artifact) is involved with both executions. Accordingly, central metadata repository 356 may merge these two metadata entries together, thereby constructing at least a partial data lineage representation for the first raw data artifact.

As described above, the merged metadata stored in central metadata repository 356 may include data lineage information for each data artifact of distributed data processing pipeline 300 individually (i.e., lineal associations between a given data artifact and its (1) its ancestor data artifacts and executions; and/or (2) its descendant data artifacts and executions), as well as data lineage information for distributed data processing pipeline 300 as a whole (i.e., lineal associations between all of the data artifacts of distributed data processing pipeline 300 and the executions which transformed and/or produced). In various examples, central repository 350 may construct data lineage representations (e.g., lineage directed acyclic graphs (DAGs)) for: (1) each of the data artifacts of data processing pipeline 300 individually; and/or (2) distributed data processing pipeline 300 as a whole (e.g., a data lineage representation for all the data artifacts of distributed data processing pipeline 300 as a whole). In certain examples, central repository 350 may construct these data lineage representations using recursive queries of stored metadata and artifacts (e.g., all child artifacts of a given artifact; all ancestor artifacts of a given artifact; all artifacts associated with the same data processing pipeline; etc.).

Inspection Stage (performed by data processing site 330): At the inspection stage, data processing site 330 inspects the data artifacts (and/or executions) of distributed data processing pipeline 300. As described above, data processing site 330 may perform this inspection for regulatory purposes, and/or to troubleshoot/debug distributed data processing pipeline 300. In various examples, data processing site 330 may utilize the contents stored in central repository 350 in order to "clone" data processing pipeline 300, for inspection purposes. Such cloning may comprise extracting: (1) all the metadata for distributed data pipeline 300, including data lineage information for distributed data processing pipeline 300 and its data artifacts; (2) all the data artifacts for distributed data processing pipeline 300; and (3) all the code (or at least a version of the code) used in distributed data processing pipeline. By extracting the above, data processing site 330 may locally reproduce distributed data processing pipeline 300 for troubleshooting/debugging purposes (data processing site 330 may also clone distributed data processing pipeline 300—or part of distributed data processing pipeline 300—in order to expand distributed data processing pipeline 300, or to perform additional experiments/executions on a particular stage of distributed data processing pipeline 300).

For example, data processing site 330 may extract and then clone the code stored in central code repository 354 (using e.g., a code pull demand). Similarly, data processing site 330 may extract the merged metadata stored in central metadata repository 356 (using e.g., a metadata pull command). As described above, the merged metadata stored in central metadata repository 356 may include data lineage representations (e.g., lineage directed acyclic graphs (DAG)) for: (1) each of the data artifacts of distributed data processing pipeline 300 individually; and/or (2) distributed data processing pipeline 300 as a whole (i.e., a lineage representation for all the data artifacts of distributed data processing pipeline 300 as a whole). In certain examples, data processing site 330 may extract these data lineage representations from central metadata repository 356 as SQLite files. Upon receipt, data processing site 330 may traverse each node of the extracted data lineage representation(s) (here, each node may represent a data artifact of data processing pipeline 300) in order to identify the data artifacts of the extracted data lineages. Data processing site 330 may then extract these data artifacts from central artifact repository 352. In certain examples, data processing site 330 may utilize a description of a given data artifact's physical location in the central artifact repository (which as described above, may be an element of stored metadata associated with the given data artifact) for the purposes of this extraction. Here, by traversing extracted data lineage representations, data processing site 330 can ensure that all relevant data artifacts and execution code are extracted for inspection and analysis.

Figure 4:
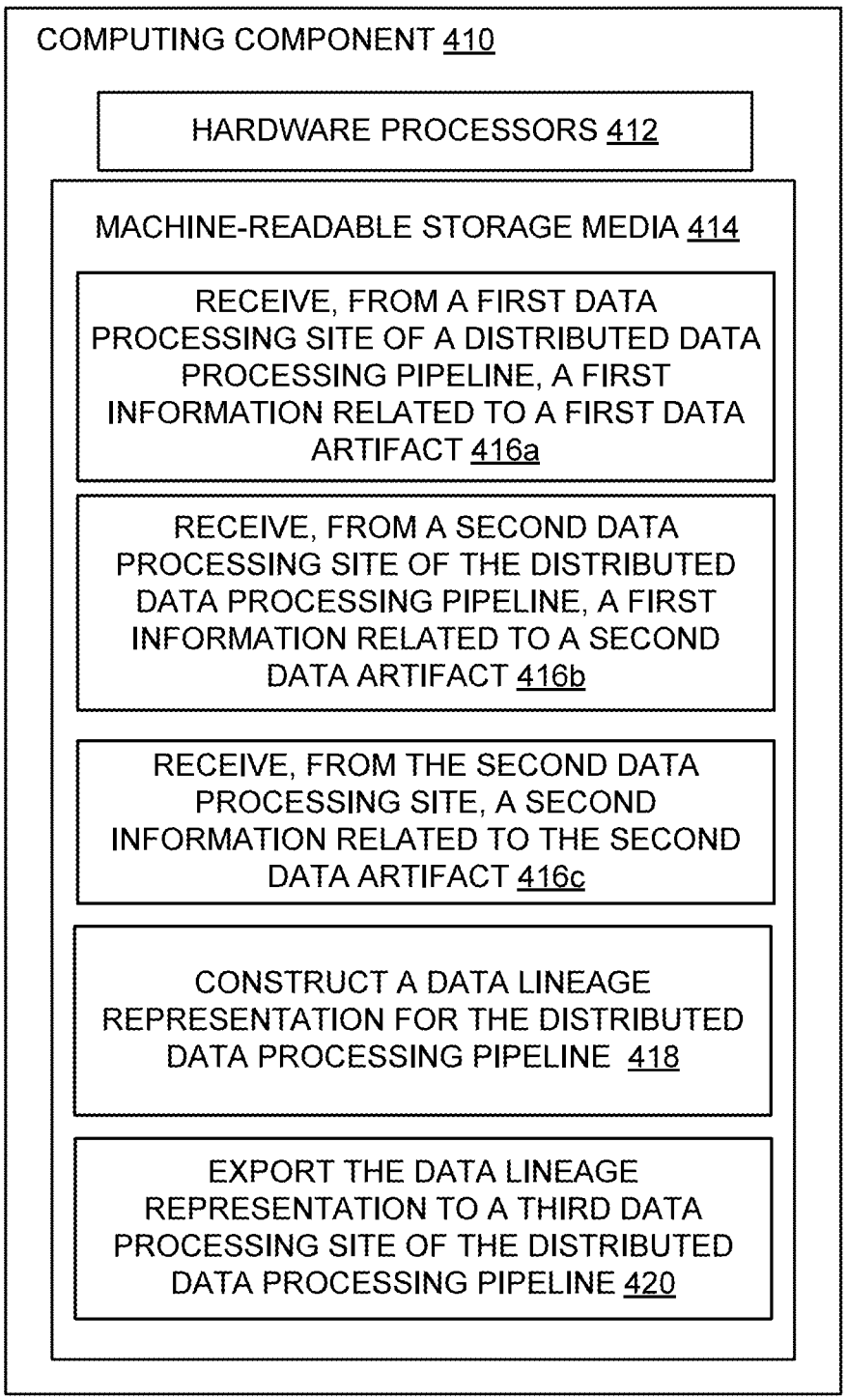
FIG. 4 depicts an example computing system that may be used to construct a data lineage representation for a distributed data processing pipeline, in accordance with various examples of the presently disclosed technology.

FIG. 4 depicts an example computing system that may be used to construct a data lineage representation for a distributed data processing pipeline, in accordance with various examples of the presently disclosed technology.

Referring now to FIG. 4, computing component 410 may be, for example, a server computer, a controller, or any other similar computing component capable of processing data. In the example implementation of FIG. 4, the computing component 410 includes a hardware processor 412, and machine-readable storage medium for 414.

Hardware processor 412 may be one or more central processing units (CPUs), semiconductor-based microprocessors, and/or other hardware devices suitable for retrieval and execution of instructions stored in machine-readable storage medium 414. Hardware processor 412 may fetch, decode, and execute instructions, such as instructions 416-420, to control processes or operations for burst preloading for available bandwidth estimation. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 414, may be any electronic, magnetic, optical, or other physical storage device that contains or stores executable instructions. Thus, machine-readable storage medium 414 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 414 may be a non-transitory storage medium, where the term "non-transitory" does not encompass transitory propagating indicators. As described in detail below, machine-readable storage medium 414 may be encoded with executable instructions, for example, instructions 416-420.

As described above, computing system 400 may be used to construct a data lineage representation for a distributed data processing pipeline executed across multiple data processing sites.

Accordingly, hardware processor 412 may execute instruction 416a to receive, from a first data processing site, a first information related to a first data artifact. The first information related to the first data artifact may comprise: (1) a first hash content value that identifies the first data artifact; and (2) an indication that the first data artifact was an output of a first execution of a first processing stage of a distributed data processing pipeline, wherein the first processing stage is performed at the first data processing site.

Relatedly, hardware processor 412 may execute instruction 416b to receive, from a second data processing site, a second information related to the first data artifact. The second information related to the first data artifact may comprise: (1) the (same) first hash content value that identifies the first data artifact; and (2) an indication that the first data artifact was an input to a first execution of a second processing stage of the distributed data processing pipeline, wherein the second processing stage is performed at the second data processing site.

Hardware processor 412 may also execute instruction 416c to receive, from the second data processing site, a first information related to a second data artifact. The first information related to the second data artifact may comprise: (1) a second hash content value that identifies the second data artifact, and (2) an indication that the second data artifact was an output of the first execution of the second processing stage.

The first and second data processing sites may be two of multiple data processing sites of the distributed data processing pipeline. Each data processing site may be e.g., a datacenter, an edge computing site, etc. The multiple data processing sites of the distributed data processing pipeline may be disconnected from each other, but may be at least intermittently connected to computing system 400.

As described above, the first data processing site may perform the first processing stage of the distributed data processing pipeline (e.g., a data discovery/preparation stage) and the second data processing site may perform the second processing stage of the distributed data processing pipeline (e.g., an ML model preparation stage). Other data processing sites of the distributed data processing pipeline may perform additional processing stages of the distributed data processing pipeline. For example, a third data processing site may perform a third processing stage (e.g., an ML model training stage), a fourth data processing site may perform a fourth processing stage (e.g., an ML model inference stage), etc.

At a given processing stage, a given data processing site may perform one or more executions for the given processing stage. An execution (including the first execution of the first data processing stage and the first execution of the second data processing stage) may be a data processing step that transforms one or more data artifacts. In other words, an execution may receive one or more input data artifacts (i.e., data artifacts received as inputs to the execution), and transform them into one or more output data artifacts (i.e., data artifacts produced by the execution). A data artifact (including the first data artifact and the second data artifact) may be a data-related input or output of the data processing pipeline (e.g., raw data, a processed dataset, an analytical or ML model derived from data, etc.). A data artifact may be an output from one execution, and/or an input into one or more different executions. For example, in addition to being an output of the first execution of the first processing stage, the first data artifact is also an input into the first execution of the second processing stage.

As described above, hardware processor 412 may execute instructions 416a-c to receive specially tailored information (i.e., the first information related to the first data artifact, the second information related to the first data artifact, the first information related to the second data artifact, etc.) from the first and second data processing sites that allow it to construct a data lineage representation for the distributed data processing pipeline—even where the distributed data processing pipeline is performed/executed across multiple distributed sites. The constructed data lineage representation may include lineal associations between and among: (1) the first execution of the first processing stage; (2) the first artifact; (3) the first execution of the second processing stage; (4) the second data artifact; etc. Examples of the presently disclosed technology can leverage such a data lineage representation to e.g., clone the distributed data processing pipeline for testing and debugging purposes.

As described above, each specially tailored information (unit) contains (1) a hash content value that identifies a given data artifact; and (2) an indication that the given data artifact was an input to, or output from, a given execution of a given data processing stage.

The received hash content values may function as the identifying keys/links that allow hardware processor 412 to stitch the data lineage representation together. In other words, hardware processor 412 may utilize the received hash content values to determine that e.g., the same data artifact (i.e., the first data artifact) is both an output from the first execution of the first processing stage, and an input to the first execution of the second processing stage—even when the first and second data processing stages are performed at different data processing sites (i.e., the first and second data processing sites respectively). The unique identification for data artifacts provided by the hash content values of the presently disclosed technology can be key where data artifacts are operated on by multiple data processing sites of a distributed data processing pipeline. This is because in many cases, distributed data processing sites will e.g., use different names/tags for the same data artifact (e.g., the first data processing site may use a first name/tag for the first data artifact and the second data processing site may use a second name/tag for the (same) first data artifact), or the same/name tag for different data artifacts (e.g., the first data processing site may use a first name/tag for the first data artifact and the second data processing site may use the (same) first name/tag for the second data artifact). As will be described below, by having the multiple data processing sites of the distributed data processing pipeline utilize the same hash algorithm/function for generating hash content values for data artifacts, examples may ensure that data artifacts are consistently named/identified across the multiple data processing sites. Such a common naming/identification scheme for data artifacts allows examples of the presently disclosed technology to construct data lineage representations for distributed data processing pipelines (and/or their constituent data artifacts) more accurately and consistently than existing technologies.

As described above, hash content values can be thought of as unique fingerprints for data artifacts. Typically, a hash content value will be a string of numerical and/or alphabetic values that uniquely identifies a data artifact. Hash content values may be generated using hash functions (e.g., cryptographic algorithms) which generate hash content values based on the content of the data artifacts. Two common hash functions/algorithms for generating hash content values for data artifacts are the MD4 and SHA1 algorithms.

Accordingly, the first hash content value may be a first string of numerical and/or alphabetic values that uniquely identifies the first data artifact across the multiple distributed data processing sites/stages of the data processing pipeline. Relatedly, the second hash content value may be a second string of numerical and/or alphabetic values that uniquely identifies the second data artifact across the multiple distributed data processing sites/stages of the data processing pipeline.

In various examples, the first and second data processing sites may utilize common hash functions/algorithms for generating hash content values. For example, the first and second data processing sites may utilize the MD5 algorithm to generate the first hash content value for the first data artifact. Accordingly, the first hash content value (identifying the first data artifact) that hardware processor 412 receives from the first data processing site may comprise the same numerical/alphabetic string as the first hash content value (identifying the first data artifact) hardware processor 412 receives from the second data processing site. By contrast, the second hash content value (identifying the second data artifact) hardware processor 412 receives from the second data processing site may comprise a different numerical/alphabetic string than the first hash content value.

As described above, the specially tailored information received by hardware processor 412 also include an indication that a given data artifact (identified by the given data artifact's hash content value) was an input to, or output from, a given execution of a given data processing stage. Here, examples of the presently disclosed technology may leverage the data processing pipeline abstraction hierarchy described in conjunction with FIG. 2 to make this indication. As described in conjunction with FIG. 2, the data processing pipeline abstraction hierarchy of the presently disclosed technology may comprise: (1) a data processing pipeline level; (2) a processing stage level beneath the data processing pipeline level; (3) an execution level beneath the processing stage level; and (4) an input/output event relationship for the execution level. Using this data processing pipeline abstraction hierarchy, examples may associate each data artifact of a data processing pipeline with (1) at least one of an input event or an output event; (2) the given execution(s) associated with the input/output event(s); (3) the given processing stage(s) associated with the given execution(s); and (4) the given data processing pipeline associated with the given processing stage(s). As described above, based on these associations, examples of the presently disclosed technology may construct a data lineage representation for the distributed data processing pipeline.

In various examples, the information received by hardware processor 412 may also contain to metadata associated with the data artifacts and executions. For example, the first information related to the first data artifact may further comprise metadata associated with: (1) the first data artifact (e.g., textual documentation for the first data artifact, a description of content within the first data artifact, a data size and data distribution for first data artifact, etc.); and (2) the first execution of the first processing stage (e.g., a programming language for the execution, information about input fields used for the execution, class of algorithm used for the execution, staging or quality assurance (QA) status for the execution, names of developers/data scientists involved with the execution, etc.). Similarly, the second information related to the first data artifact may further comprise metadata associated with: (1) the first data artifact; and (2) the first execution of the second processing stage. The first information related to the second data artifact may further comprise metadata associated with: (1) the second data artifact; and (2) the first execution of the second processing stage. As described in conjunction with FIG. 3, the hash content value for a given data artifact and the indication that the given data artifact was an input to, or output from, a given execution—may also be considered metadata associated with the given data artifact.

As will be described in conjunction with instruction 418, based on the metadata it receives, hardware processor 412 may compile a merged metadata representation that provides a "global view" of metadata for the data processing pipeline. As will be described below, examples of the presently disclosed technology may utilize this merged metadata representation, along with the constructed data lineage representation for the distributed data processing pipeline, to reproduce/clone the distributed data processing pipeline for e.g., for testing and debugging purposes.

Hardware processor 412 may execute instruction 418 to construct a data lineage representation for the distributed data processing pipeline based on the information received after executing instructions 416*a-c*.

As described above, the constructed data lineage representation may comprise lineal associations between and among: (1) the first execution of the first processing stage; (2) the first artifact; (3) the first execution of the second processing stage; (4) the second data artifact; etc. In other words, the constructed data lineage representation may associate: (1) the first data artifact as an output from the first execution of the first processing stage; (2) the first data artifact as an input into the first execution of the second processing stage; (3) the second data artifact as an output from the first execution of the second processing stage; etc.

In examples where the information received by hardware processor 412 also contain (other) metadata associated with the data artifacts and executions, hardware processor 412's execution of instruction 418 may further comprise compiling a merged metadata representation for the data processing pipeline. As described above, the metadata representation may provide a "global view" of metadata for the data processing pipeline. Examples of the presently disclosed technology may utilize this merged metadata representation, along with the constructed data lineage representation for the data processing pipeline, to reproduce/clone the data processing pipeline for e.g., testing and debugging purposes.

Accordingly, hardware processor 412 may execute instruction 420 to export the constructed data lineage representation for the distributed data processing pipeline to a third data processing site of the distributed data processing pipeline. In certain examples, hardware processor 412's execution of instruction 420 may further comprise exporting the merged metadata representation for the data pipeline to the third data processing site.

As described above, the third data processing site may utilize the constructed data lineage representation and/or the merged metadata representation for the distributed data processing pipeline to clone the distributed data processing pipeline for e.g., testing and debugging purposes.

In various examples, instead of the exporting the constructed data lineage representation and merged metadata representation to the third data processing site, hardware processor 412 may utilize the constructed data lineage representation and merged metadata representation to clone the distributed data processing pipeline itself. Accordingly, hardware processor 412 may utilize the cloned distributed data processing pipeline to e.g., test and debug the distributed data processing pipeline.

Figure 5:
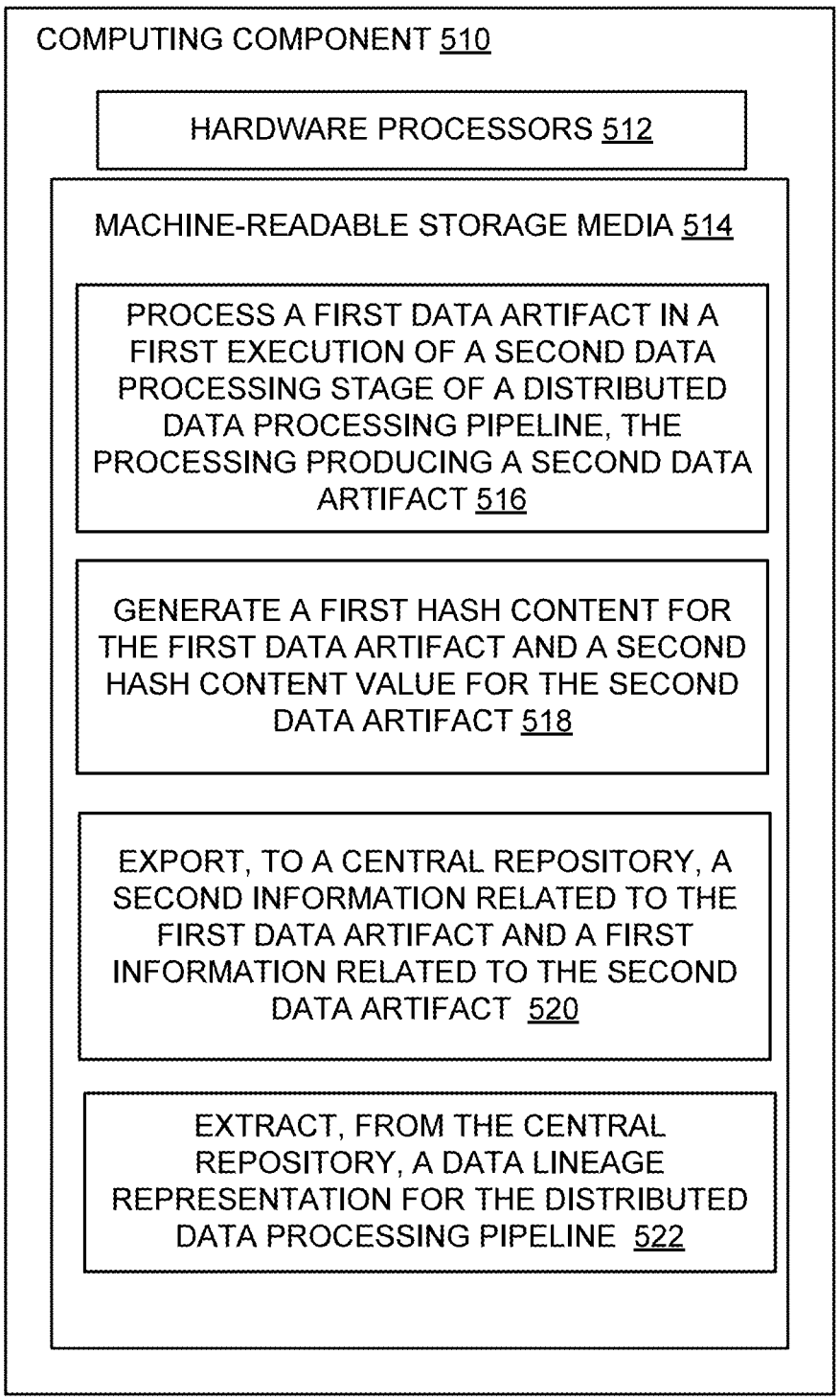
FIG. 5 is depicts an example computing system that may be used to export, to a central repository shared by multiple data processing sites of the distributed data processing pipeline, information related to data artifacts processed by the computing system, in accordance with various examples of the presently disclosed technology.

FIG. 5 depicts an example computing system 500 associated with a second data processing site of a distributed data processing pipeline that may be used to export, to a central repository shared by multiple data processing sites of the distributed data processing pipeline (including the second data processing site), information related to data artifacts processed by computing system 500, in accordance with various examples of the presently disclosed technology. As described above, the central repository may utilize information received from the multiple data processing sites of the distributed data processing pipeline to construct a data lineage representation for the distributed data processing pipeline. Referring now to FIG. 5, computing component 510 may be, for example, a server computer, a controller, or any other similar computing component capable of processing data. In the example implementation of FIG. 5, the computing component 510 includes a hardware processor 512, and machine-readable storage medium for 514. In various examples, computing system 500 may be associated with a second data processing site of the data processing pipeline.

Hardware processor 512 and machine-readable storage medium 514 may be the same/similar as hardware processor 412 and machine-readable storage medium 414 respectively. Accordingly, machine-readable storage medium 414 may be encoded with executable instructions, for example, instructions 516-522.

Hardware processor 512 may execute instruction 516 process a first data artifact in a first execution of a second data processing stage of the distributed data processing pipeline, wherein the processing produces a second data artifact.

The second data processing site may be one of multiple data processing sites of the distributed data processing pipeline. Each data processing site may be e.g., a datacenter, an edge computing site, etc. The multiple data processing sites of the distributed data processing pipeline may be disconnected from each other, but may be at least intermittently connected to the central repository.

As described above, the second data processing site may perform the second processing stage of the data processing pipeline (e.g., an ML model preparation stage). The second processing stage may follow a first processing stage (e.g., a data discovery/preparation stage) performed by a first data processing site. In various examples, the first data processing site/processing stage may produce the first data artifact. Other data processing sites of the distributed data processing pipeline may perform additional processing stages of the distributed data processing pipeline. For example, a third data processing site may perform a third processing stage (e.g., an ML model training stage), a fourth data processing site may perform a fourth processing stage (e.g., an ML model inference stage), etc.

At a given processing stage, a given data processing site may perform one or more executions for the given processing stage. An execution (including the first execution of the second data processing stage) may be a data processing step that transforms one or more data artifacts. In other words, an execution may receive one or more input data artifacts (i.e., data artifacts received as inputs to the execution), and transform them into one or more output data artifacts (i.e., data artifacts produced by the execution). Accordingly, processing the first data artifact in the first execution of the second data processing stage may comprise transforming the first data artifact into the second data artifact.

A data artifact (including the first data artifact and the second data artifact) may be a data-related input or output of the distributed data processing pipeline (e.g., raw data, a processed dataset, an ML model, etc.). A data artifact may be an output from one execution, and/or an input into one or more different executions. For example, in addition to being an input into the first execution of the second processing stage, the first data artifact may also be an output from e.g., a first execution of a first processing stage.

Hardware processor 512 may execute instruction 518 generate: (1) a first hash content value for the first data artifact that identifies the first data artifact; and (2) a second hash content value for the second data artifact that identifies the second data artifact.

As described above, the generated hash content values may function as identifying keys that allow the central repository to stitch a data lineage representation together for the distributed data processing pipeline. In other words, the central repository may utilize the hash content values it receives to determine that e.g., the same data artifact (i.e., the first data artifact) is both an output from a first execution of a first processing stage, and an input to the first execution of the second processing stage—even when the first and second processing stages are performed at different data processing sites (i.e., the first and second data processing sites respectively).

As described above, hash content values can be thought of as unique fingerprints for data artifacts. Typically, a hash content value will be a string of numerical and/or alphabetic values that uniquely identifies a data artifact. Hash content values may be generated using hash functions (e.g., cryptographic algorithms) which generate hash content values based on the content of the data artifacts. Two common hash functions/algorithms for generating hash content values for data artifacts are the MD5 and SHA1 algorithms.

Accordingly, hardware processor 512 may utilize a hash function/algorithm (e.g., the MD5 or SHA1 algorithm) to generate the first hash content value for the first data artifact and the second hash content value for the second data artifact. The first hash content value may be a first string of numerical and/or alphabetic values that uniquely identifies the first data artifact across the multiple distributed data processing sites/stages of the distributed data processing pipeline. Relatedly, the second hash content value may be a second string of numerical and/or alphabetic values that uniquely identifies the second data artifact across the multiple distributed data processing sites/stages of the distributed data processing pipeline.

In various examples, the second data processing site may utilize the same hash function/algorithm for generating hash content values as the other data processing sites of the distributed data processing pipeline. For example, all the data processing sites of the distributed data processing pipeline (including the second data processing site) may utilize the MD5 algorithm to generate hash content values for data artifacts. Accordingly, the first hash content value that hardware processor 512 generates for the first data artifact may comprise the same numerical/alphabetic string as the first hash content value that another data processing site generates for the first data artifact. The central repository may leverage such commonality to stitch together received information relating to common data artifacts (e.g., a first information related to the first data artifact and a second information related to the first data artifact).

Accordingly, hardware processor may execute instruction 520 to export, to the central repository shared by at least the second data processing site and the first data processing site: (1) a second information related to the first data artifact; and (2) a first information related to the second data artifact (here, it should be understood that the terms first and second do not necessarily connote an order).

The second information related to the first data artifact may comprise: (a) the first hash content value that identifies the first data artifact; and (b) an indication that the first data artifact was an input to the first execution of the second processing stage.

The first information related to the second data artifact may comprise: (a) the second hash content value that identifies the second data artifact; and (b) an indication that the second data artifact was an output from the first execution of the second processing stage.

As described above, the information exported by hardware processor 512 may comprise specially tailored information that allow the central repository to construct a data lineage representation for the distributed data processing pipeline. The constructed data lineage representation may include lineal associations between and among, e.g.: (1) a first execution of a first processing stage that produced the first data artifact; (2) the first data artifact; (3) the first execution of the second processing stage; (4) the second data artifact; etc. Examples of the presently disclosed technology can leverage such a data lineage representation to e.g., clone the distributed data processing pipeline for testing and debugging purposes.

As described above, the specially tailored information exported by hardware processor 512 include an indication that a given data artifact (identified by the given data artifact's hash content value) was an input to, or output from, a given execution of a given data processing stage. Here, hardware processor 512 may leverage the data processing pipeline abstraction hierarchy described in conjunction with FIG. 2 to make/generate this indication. As described in conjunction with FIG. 2, the data processing pipeline abstraction hierarchy of the presently disclosed technology may comprise: (1) a data processing pipeline level; (2) a processing stage level beneath the data processing pipeline level; (3) an execution level beneath the processing stage level; and (4) an input/output event relationship for the execution level. Using this data processing pipeline abstraction hierarchy, examples of the presently disclosed technology (including hardware processor 512) may associate a given data artifact of the data processing pipeline with (1) at least one of an input event or an output event; (2) the given execution(s) associated with the input/output event(s); (3) the given processing stage(s) associated with the given execution(s); and (4) the given data processing pipeline associated with the given processing stage(s). As described above, based on the associations indicated in the information exported by hardware processor 512 (along with similar information exported by other data processing sites of the distributed data processing pipeline) the central repository may construct a data lineage representation for the distributed data processing pipeline.

In various examples, the information exported by hardware processor 512 may also contain information related to metadata associated with the data artifacts and executions. For example, the second information related to the first data artifact may further comprise metadata associated with: (1) the first data artifact (e.g., textual documentation for the first data artifact, a description of content within the first data artifact, a data size and data distribution for first data artifact, etc.); and (2) the first execution of the second processing stage (e.g., a programming language for the execution, information about input fields used for the execution, class of algorithm used for the execution, staging or quality assurance (QA) status for the execution, names of developers/data scientists with the execution, etc.). Similarly, the first information related to the second data artifact may further comprise metadata associated with: (1) the second data artifact; and (2) the first execution of the second processing stage.

Based on the metadata it receives, hardware processor 512 may compile a merged metadata representation that provides a "global view" of metadata for the data processing pipeline. As will be described below, examples of the presently disclosed technology may utilize this merged metadata representation, along with the constructed data lineage representation for the distributed data processing pipeline, to reproduce/clone the distributed data processing pipeline for e.g., for testing and debugging purposes.

Accordingly, hardware processor 512 may execute instruction 522 to extract, from the central repository, a data lineage representation for the distributed data processing pipeline. In certain examples, hardware processor 512's execution of instruction 522 may further comprise extracting, from the central repository, a merged metadata representation for the distributed data processing pipeline. The extracted data lineage representation and merged metadata representation may be based in part on the information hardware processor 512 exported to the central repository. Accordingly, the extracted data lineage representation may at least represent a lineage representation for the first and second data artifacts. In other words, the extracted data lineage representation may at least comprise lineal associations between: (1) the first data artifact; (2) the first execution of the second processing stage; and (3) the second data artifact.

As described above, in various examples, hardware processor 512 may utilize the extracted data lineage representation and the merged metadata representation to clone/reproduce the distributed data processing pipeline for e.g., debugging and testing purposes.

Figure 6:
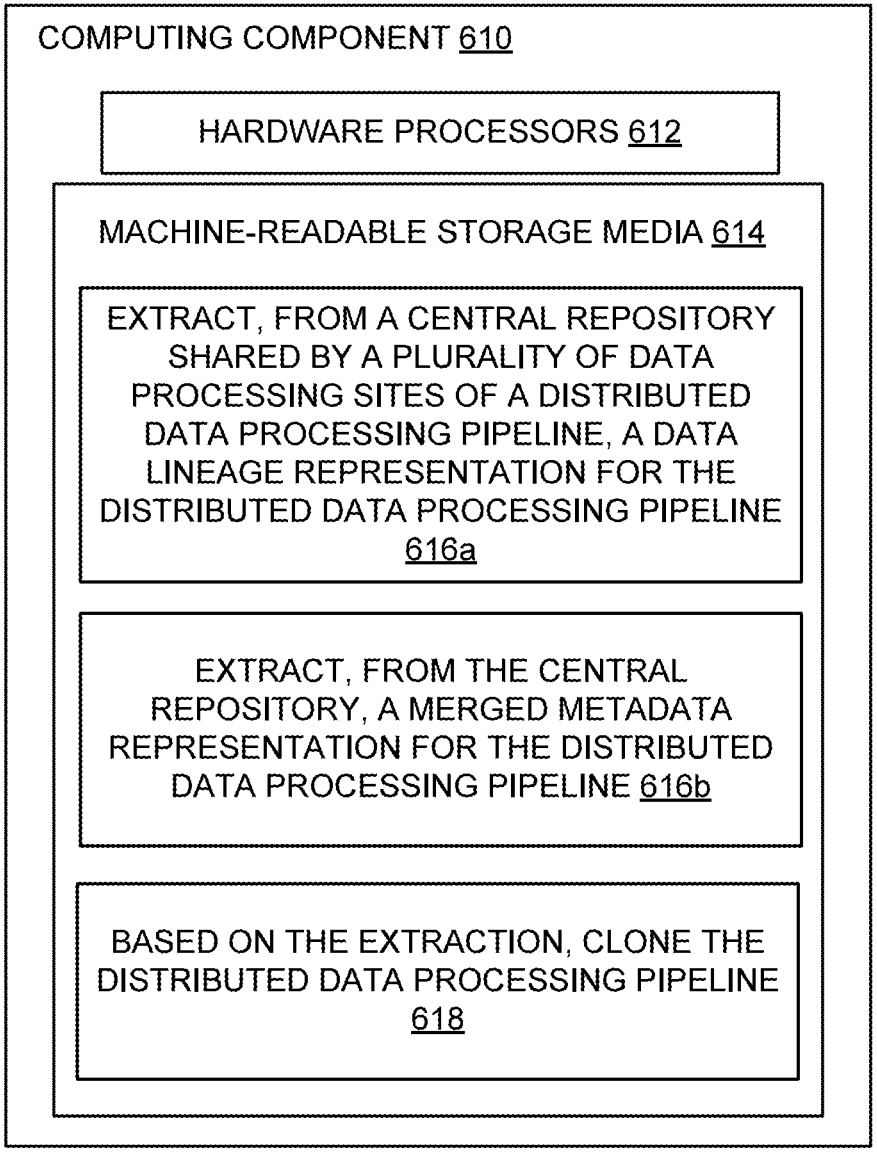
FIG. 6 is an example computing system that may be used to clone a distributed data processing pipeline, in accordance with various examples of the presently disclosed technology

FIG. 6 depicts an example computing system 600 that may be used to clone a distributed data processing pipeline, in accordance with various examples of the presently disclosed technology. Referring now to FIG. 6, computing component 610 may be, for example, a server computer, a controller, or any other similar computing component capable of processing data. In the example implementation of FIG. 6, the computing component 610 includes a hardware processor 612, and machine-readable storage medium for 614.

Hardware processor 612 and machine-readable storage medium 614 may be the same/similar as hardware processor 412 and machine-readable storage medium 414 respectively. Accordingly, machine-readable storage medium 614 may be encoded with executable instructions, for example, instructions 616-618.

Hardware processor 612 may execute instruction 616*a* to extract, from a central repository shared by a plurality of data processing sites of a distributed data processing pipeline, a data lineage representation for the distributed data processing pipeline. The distributed data processing pipeline may comprise a plurality of executions and a plurality of data artifacts, each execution having been performed in one of a plurality of processing stages, each of the plurality of processing stages having been performed by one of the plurality of data processing sites. Here, each of the plurality of data artifacts may be at least one of (1) an input to one or more of the plurality of executions; and (2) an output from one or more of the plurality of executions.

In various examples, hardware processor 612 may execute instruction 616*b* to extract, from the central repository, a merged metadata representation that represents metadata associated with the plurality of data artifacts and the plurality of executions (e.g., textual documentation for the plurality of data artifacts, descriptions of content within the plurality of data artifacts, data sizes and data distributions for the plurality of data artifacts, programming languages for the plurality of executions, information about input fields used for the plurality of executions, classes of algorithm used for the plurality of executions, staging or quality assurance (QA) status for the plurality of executions, names of developers/data scientists involved with the plurality of executions, etc.).

The data lineage representation may comprise lineal associations for the plurality of data artifacts and the plurality of executions, wherein the lineal associations indicate that each data artifact was at least one of: (a) an input to a given execution; and (b) an output from a given execution.

The plurality of data processing sites may be multiple data processing sites of the distributed data processing pipeline. Each data processing site may be e.g., a datacenter, an edge computing site, etc. The plurality of data processing sites of the distributed data processing pipeline may be disconnected from each other, but may be at least intermittently connected to the central repository.

As described above, each of the plurality of data processing sites may perform a processing stage of the distributed data processing pipeline. For example, a first data processing site may perform a first processing stage (e.g., a data discovery/preparation stage), a second data processing site may perform a second processing stage (e.g., an ML model preparation stage), a third data processing site may perform a third processing stage (e.g., an ML model training stage, etc.

At a given processing stage, a given data processing site may perform one or more executions for the given processing stage. An execution (including the plurality of executions) may be a data processing step that transforms one or more data artifacts. In other words, an execution may receive one or more input data artifacts (i.e., data artifacts received as inputs to the execution), and transform them into one or more output data artifacts (i.e., data artifacts produced by the execution). A data artifact (including the plurality of data artifacts) may be a data-related input or output of the data processing pipeline (e.g., raw data, a processed dataset, an ML model, etc.). A data artifact may be an output from one execution, and/or an input into one or more different executions. For example, in addition to being an output of a first execution of a first processing stage, a first data artifact may also be an input into a first execution of a second processing stage.

As described above, the central repository may construct the data lineage representation—even where the distributed data processing pipeline is performed/executed across the plurality of data processing sites—based on specially tailored information received from the plurality of data processing sites of the distributed data processing pipeline.

As described above, each specially tailored information may contain (1) a hash content value that identifies a given data artifact; and (2) an indication that the given data artifact was an input to, or output from, a given execution of a given data processing stage.

Here, the hash content values may function as the identifying keys that allow the central repository to stitch the extracted data lineage representation together. In other words, the central repository may utilize the received hash content values to determine that e.g., the same data artifact (e.g., a first data artifact) is both an output from a first execution of a first processing stage, and an input to a first execution of the second processing stage—even when the first and second processing stages are performed at different data processing sites (e.g., a first and second data processing site respectively).

As described above, hash content values can be thought of as unique fingerprints for data artifacts. Typically, a hash content value will be a string of numerical and/or alphabetic values that uniquely identifies a data artifact. Hash content values may be generated using hash functions (e.g., cryptographic algorithms) which generate hash content values based on the content of the data artifacts. Two common hash functions/algorithms for generating hash content values for data artifacts are the MD5 and SHA1 algorithms.

Accordingly, a first hash content value may be a first string of numerical and/or alphabetic values that uniquely identifies a first data artifact across the plurality of data processing sites/stages of the data processing pipeline. Relatedly, a second hash content value may be a second string of numerical and/or alphabetic values that uniquely identifies the second data artifact across the plurality of data processing sites/stages of the distributed data processing pipeline.

In various examples, the plurality of data processing sites may utilize common hash functions/algorithms for generating hash content values. For example, the plurality of data processing sites may utilize the MD5 algorithm to generate a first hash content value for a first data artifact. Accordingly, the first hash content value (identifying the first data artifact) that the central repository receives from a first data processing site may comprise the same numerical/alphabetic string as the first hash content value (identifying the first data artifact) that the central repository receives from a second data processing site. By contrast, a second hash content value (identifying the second data artifact) that the central repository receives from the second data processing site may comprise a different numerical/alphabetic string than the first hash content value.

As described above, the specially tailored information received by the central repository may also include an indication that a given data artifact (identified by the given data artifact's hash content value) was an input to, or output from, a given execution of a given data processing stage. Here, examples of the presently disclosed technology may leverage the data processing pipeline abstraction hierarchy described in conjunction with FIG. 2 to make this indication. As described in conjunction with FIG. 2, the data processing pipeline abstraction hierarchy of the presently disclosed technology may comprise: (1) a data processing pipeline level; (2) a processing stage level beneath the data processing pipeline level; (3) an execution level beneath the processing stage level; and (4) an input/output event relationship for the execution level. Using this data processing pipeline abstraction hierarchy, examples may associate each data artifact of a data processing pipeline with (1) at least one of an input event or an output event; (2) the given execution(s) associated with the input/output event(s); (3) the given processing stage(s) associated with the given execution(s); and (4) the given data processing pipeline associated with the given processing stage(s). As described above, based on these associations, examples of the presently disclosed technology may construct a data lineage representation for the distributed data processing pipeline.

As described above, in various examples, hardware processor 612 may execute instruction 616b to extract, from the central repository, a merged metadata representation that represents metadata associated with the plurality of data artifacts and the plurality of executions The extracted merged metadata representation may comprise a "global" view of metadata for the distributed data processing pipeline. As will be described below, hardware processor 612 may utilize the extracted merged metadata representation (along with the extracted data lineage representation) to clone/reproduce the distributed data processing pipeline for e.g., testing and debugging purposes.

Accordingly, hardware processor 612 may execute instruction 620 to clone the distributed data processing pipeline based on the extracted data lineage representation and extracted metadata representation. The cloned distributed data processing pipeline may comprise all the code, data, metadata, and dependencies of the distributed data processing pipeline.

As described above, examples of the presently disclosed technology can clone a distributed data processing pipeline in order to inspect/troubleshoot the cloned distributed data processing pipeline. In some cases, such inspection/troubleshooting may be a regulatory requirement that requires inspection of all data artifacts of a data processing pipeline when certain events occur (poor model performance, biasedness in model etc.). Accordingly, it can be extremely advantageous to be able to clone an entire distributed data processing pipeline (including its code, data, metadata, and all their associated its dependencies) in order to locally reproduce the data processing pipeline's execution for testing and debugging purposes. Using the cloned distributed data processing pipeline, examples may e.g., perform one or more quality assurance checks on the distributed data processing pipeline, to analyze data trustworthiness for one or more data artifacts of the distributed data processing pipeline, etc.

As described in conjunction with FIG. 3, in addition to extracting the data lineage representation and the merged metadata representation, hardware processor 612 may also extract, from the central repository: (1) the code used for the plurality of executions of the distributed data processing pipeline (using e.g., a code pull demand); and (2) the plurality of data artifacts of the distributed data processing pipeline. Accordingly, hardware processor 612 may essentially use the extracted data lineage representation and merged metadata representation as road maps for cloning/reproducing the distributed data processing pipeline from the extracted data artifacts and code.

Figure 7:
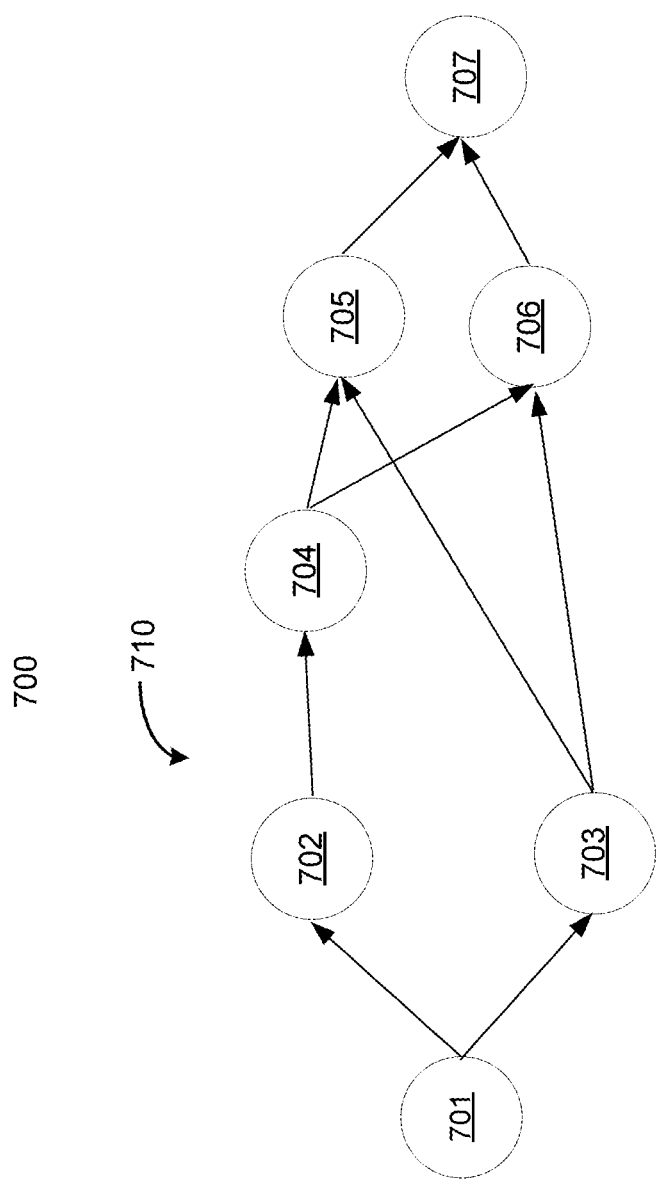
FIG. 7 depicts an example data lineage representation for a distributed data processing pipeline, in accordance with various examples of the presently disclosed technology.

FIG. 7 depicts an example data lineage representation 710 for an example data processing pipeline 700, in accordance with examples of the presently disclosed technology. In particular, data lineage representation 710 may represent a simple directed acyclic graph (i.e., a directed graph with no cycles) that represents the data lineage for data processing pipeline 700.

In the specific example of FIG. 7, data processing pipeline 700 operates on (i.e., consumes and/or produces) seven data artifacts (i.e., data artifacts 701-707). As described above, data lineage representation 710 may contain lineal associations between these seven data artifacts. For example, data lineage representation 710 contains lineal associations between data artifact 707 and its two direct ancestor data artifacts: data artifacts 705 and 706 (i.e., two of the data artifacts used to produce data artifact 707). Likewise, data lineage representation 710 contains lineal associations between data artifact 706 and its two direct ancestor data artifacts (i.e., data artifacts 703 and 704), and so on. Here, data artifacts 703 and 704 may also be considered (indirect) ancestors of data artifact 707 (relatedly, data artifact 707 may be considered a descendant to data artifacts 701-706).

In the specific example of FIG. 7, data lineage representation 710 does not contain specific nodes for executions used to produce data artifacts 701-707 (however, in various examples the arrows of data lineage representation 710 may represent such executions). As will be described in conjunction with FIG. 8, example may also construct data lineage representations which include specific nodes for executions.

Figure 8:
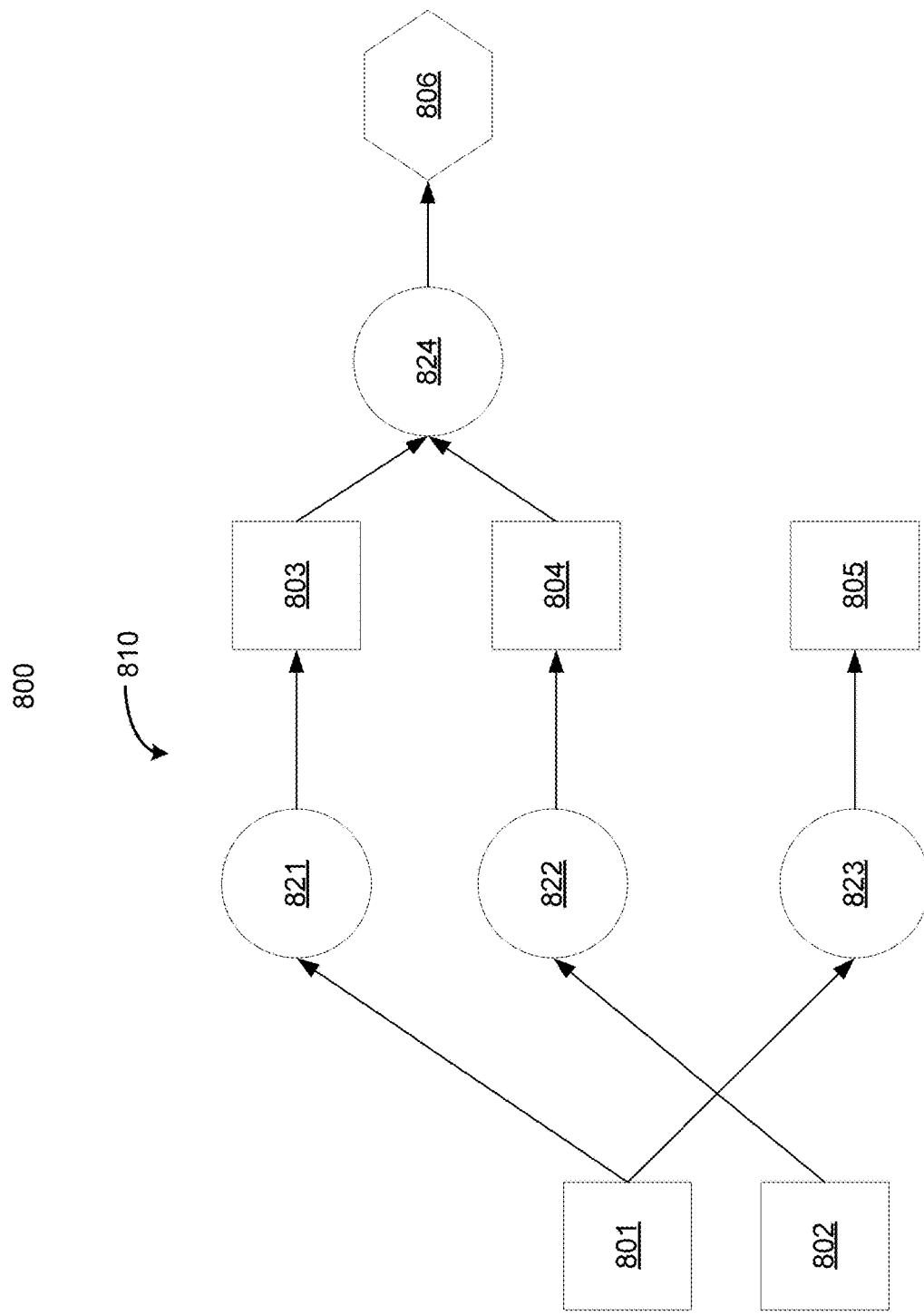
FIG. 8 depicts another example data lineage representation for a distributed data processing pipeline, in accordance with various examples of the presently disclosed technology.

FIG. 8 depicts an example data lineage representation 810 for an example data processing pipeline 800, in accordance with examples of the presently disclosed technology.

As described above, data lineage representation 810 may represent lineal associations between the data artifacts (i.e., data artifacts 801-806) and executions (i.e., executions 821-824) of data processing pipeline 800. For example, data lineage representation 810 illustrates that execution 821 was used to transform data artifact 801 (e.g., a first raw data artifact) into data artifact 803 (e.g., a first processed dataset). Likewise, data lineage representation 810 illustrates that execution 822 was used to transform data artifact 802 (e.g., a second raw data artifact) into data artifact 804 (e.g., a second processed dataset). Data lineage representation 810 also illustrates that execution 824 was used to combine and then transform data artifacts 803 and 804 into data artifact 806 (e.g., a machine learning model). Accordingly, data artifacts 801-804 may be considered ancestor data artifacts for data artifact 806. Likewise, executions 821, 822, and 824 may be considered ancestor executions for data artifact 806.

Figure 9:
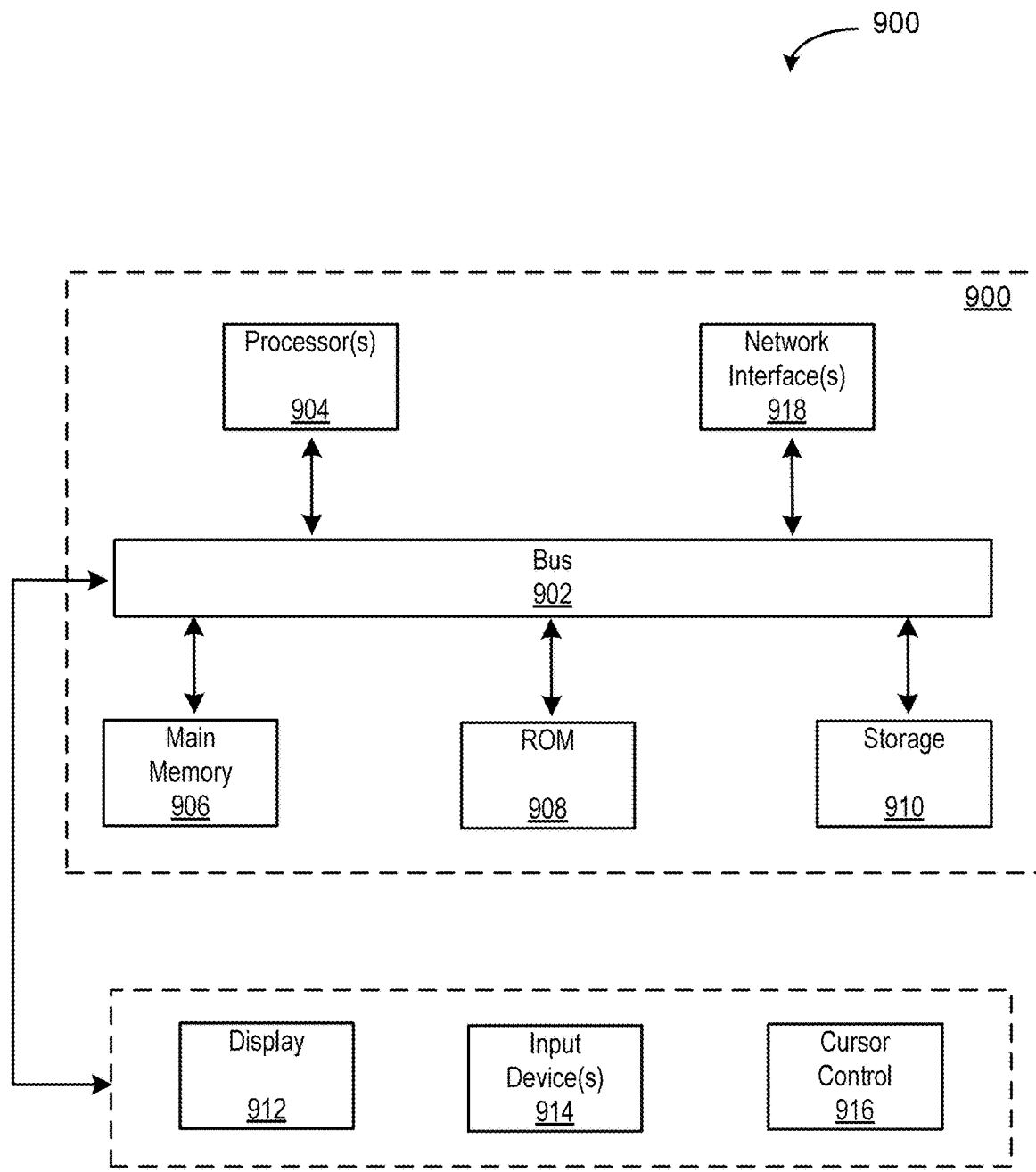
FIG. 9 depicts a block diagram of an example computer system in which various of the examples described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   receiving, from a first data processing site, a first hash content value that identifies a data artifact and a first indication that the data artifact was an output from a first processing stage of a data processing pipeline, wherein the first processing stage is performed at the first data processing site;
   receiving, from a second data processing site, a second hash content value that identifies the data artifact and a second indication that the data artifact was an input to a second processing stage of the data processing pipeline, wherein the second processing stage is performed at the second data processing site;
   generating a first node of the first hash content value from the first data processing site and a second node of the second hash content value from the second data processing site, wherein output of the second processing stage generates a descendant node that depends on the first node;
   in response to determining that the first hash content value and the second hash content value are a same hash, determining that the first node and the second node represent a same data artifact based on the same hash;
   merging the first node and the second node to generate a merged node of the same hash;
   constructing a data lineage representation that comprises the merged node as a predecessor of the descendant node, the data lineage representation comprising lineal relationships of the data artifact at the first processing stage and the second processing stage that associates the merged node and the descendant node;
   exporting the data lineage representation to the first data processing site or the second data processing site; and
   enabling the first data processing site or the second data processing site to locally reproduce the data processing pipeline for the data artifact using the data lineage representation.

2. The method of claim 1, wherein the data artifact is a first data artifact, and the method is further comprising:
   receiving, from the second data processing site, a third hash content value that identifies a second data artifact and a third indication that the second data artifact was output from the second processing stage of the data processing pipeline; and
   generating a second data lineage representation for the data processing pipeline which represents lineal relationships for the first data artifact and the second data artifact.

3. The method of claim 2, wherein the second data lineage representation comprises lineal relationships between the first data artifact and the second data artifact.

4. The method of claim 2, wherein the second data lineage representation for the data processing pipeline comprises lineal relationships between:
   a first execution of the first processing stage;
   the first data artifact;
   a first execution of a second processing stage; and
   the second data artifact.

5. The method of claim 1, wherein the data artifact is a first data artifact, and the method is further comprising:
   receiving, from the first data processing site, metadata associated with the first data artifact and the first processing stage;
   receiving, from the second data processing site, metadata associated with a second data artifact and the second processing stage, wherein the first data artifact is different from the second data artifact; and
   based on the metadata associated with the first data artifact and the metadata associated with the second data artifact, creating a metadata association for the first data artifact and the second data artifact for the data processing pipeline.

6. The method of claim 1, wherein the data artifact comprises a first dataset.

7. The method of claim 6, wherein the data artifact is a first data artifact, and wherein a second data artifact comprises at least one of a second dataset and a machine learning model that is different than the first data artifact.

8. The method of claim 1, wherein the first processing stage of the data processing pipeline is a training stage for machine learning models and the second processing stage of the data processing pipeline is an inference stage for machine learning models.

9. The method of claim 1, further comprising indexing the data lineage representation using Git.

10. The method of claim 1, wherein the locally reproduce d data processing pipeline for the data artifact comprises a full data processing pipeline including code, data, metadata, and associated dependencies.

11. The method of claim 1, further comprising:
    locally merging the locally reproduced data processing pipeline with metadata for the data processing pipeline.

12. The method of claim 1, further comprising:
    receiving metadata that comprises a description of a physical location in a data artifact repository where the data artifact is located; and
    creating additional metadata associated with the data artifact and code used to collect the data artifact.

13. The method of claim 1, further comprising:
    based on the first indication from the first data processing site and the second indication from the second data processing site, generating an abstraction hierarchy of the data processing pipeline; and
    based on the abstraction hierarchy, updating the data lineage representation.

14. A non-transitory computer-readable medium storing instructions, which when executed by one or more processing resources of a data processing pipeline, cause the one or more processing resources to:
    receive a first hash content value that identifies a data artifact and a first indication that the data artifact was output from a first processing stage of the data processing pipeline, wherein the first processing stage is performed at a first data processing site;
    receive a second hash content value that identifies the data artifact and a second indication that the data artifact was an input to a second processing stage of the data processing pipeline, wherein the second processing stage is performed at a second data processing site;

generate a first node of the first hash content value from the first data processing site and a second node of the second hash content value from the second data processing site, wherein output of the second processing stage generates a descendant node that depends on the first node;

in response to determining that the first hash content value and the second hash content value are a same hash, determine that the first node and the second node represent a same data artifact based on the same hash;

merge the first node and the second node to generate a merged node of the same hash;

construct a data lineage representation that comprises the merged node as a predecessor of the descendant node, the data lineage representation comprising lineal relationships of the data artifact at the first processing stage and the second processing stage that associates the merged node and the descendant node;

export the data lineage representation to the first data processing site or the second data processing site; and enable the first data processing site or the second data processing site to locally reproduce the data processing pipeline for the data artifact using the data lineage representation.

15. The non-transitory computer-readable medium storing instructions of claim 14, comprising further instructions that cause the one or more processing resources to:
receive metadata associated with the data artifact and a first execution of a data processing stage.

16. The non-transitory computer-readable medium storing instructions of claim 14, wherein the data lineage representation for the data processing pipeline comprises lineal associations between:
the data artifact; and
a second data artifact.

17. The non-transitory computer-readable medium storing instructions of claim 14, wherein the data artifact comprises a first dataset.

18. The non-transitory computer-readable medium storing instructions of claim 17, wherein the data artifact is a first data artifact, and wherein a second data artifact comprises at least one of a second dataset and a machine learning model that is different than the first data artifact.

19. The non-transitory computer-readable medium storing instructions of claim 14, wherein the first node was an input to a first execution of the second processing stage associated with the second node.

20. The non-transitory computer-readable medium storing instructions of claim 14, wherein the second node was an output to a first execution of the first processing stage associated with the first node.

* * * * *